(12) United States Patent
Suzuki

(10) Patent No.: US 10,415,487 B2
(45) Date of Patent: Sep. 17, 2019

(54) CONTROL DEVICE FOR STARTING AN ENGINE OF A VEHICLE

(71) Applicant: TOYOTA JIDOSHA KABUSHIKI KAISHA, Toyota-shi, Aichi-ken (JP)

(72) Inventor: Yusuke Suzuki, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 217 days.

(21) Appl. No.: 15/329,742

(22) PCT Filed: Jul. 29, 2015

(86) PCT No.: PCT/IB2015/001278
§ 371 (c)(1),
(2) Date: Jan. 27, 2017

(87) PCT Pub. No.: WO2016/016708
PCT Pub. Date: Feb. 4, 2016

(65) Prior Publication Data
US 2018/0209358 A1    Jul. 26, 2018

(30) Foreign Application Priority Data

Jul. 29, 2014 (JP) ................................ 2014-154142
May 27, 2015 (JP) ................................ 2015-107228

(51) Int. Cl.
*F02D 37/02* (2006.01)
*F02D 41/06* (2006.01)
(Continued)

(52) U.S. Cl.
CPC ............. *F02D 37/02* (2013.01); *B60W 20/40* (2013.01); *F02D 35/023* (2013.01);
(Continued)

(58) Field of Classification Search
CPC ...... F02D 37/02; F02D 35/028; F02D 41/062; F02D 41/1497; F02D 41/22;
(Continued)

(56) References Cited

U.S. PATENT DOCUMENTS 4,545,349 A * 10/1985 Ito ..................... F02D 31/005
123/339.11
2010/0036573 A1 * 2/2010 Tahara ................. F16D 48/06
701/68

FOREIGN PATENT DOCUMENTS

| JP | 2000-073838 A | 3/2000 |
|---|---|---|
| JP | 2011-094535 A | 5/2011 |

(Continued)

*Primary Examiner* — Rodney A Butler
(74) *Attorney, Agent, or Firm* — Hunton Andrews Kurth LLP

(57) ABSTRACT

A control device for a vehicle includes an electronic control unit which executes electric assist of rotation of an engine crankshaft by a motor in association with engagement of a clutch, at the time of an ignition start in which fuel injection and sparking are executed with respect to a target cylinder, which has been stopped in an expansion stroke. The electronic control unit corrects at least one of the initiation timing of sparking which is to be initially performed in the target cylinder at the time of the ignition start and an electric assist torque which is to be used for the ignition start, on the basis of a combination of the relationship between an acquisition value and an estimation value of a torque indication value, and the relationship between an acquisition value and an estimation value of an ignition delay time.

11 Claims, 10 Drawing Sheets

(51) Int. Cl.

| | | |
|---|---|---|
| *F02D 41/14* | (2006.01) | |
| *F02D 41/22* | (2006.01) | |
| *F02N 19/00* | (2010.01) | |
| *F02P 5/04* | (2006.01) | |
| *F02P 5/15* | (2006.01) | |
| *F02D 35/02* | (2006.01) | |
| *B60W 20/40* | (2016.01) | |
| *F02N 11/08* | (2006.01) | |
| *F02N 11/04* | (2006.01) | |
| *F02N 99/00* | (2010.01) | |
| *F02P 5/153* | (2006.01) | |
| *F02D 41/02* | (2006.01) | |
| *F02D 41/24* | (2006.01) | |

(52) U.S. Cl.
CPC ......... *F02D 35/028* (2013.01); *F02D 41/062* (2013.01); *F02D 41/1497* (2013.01); *F02D 41/22* (2013.01); *F02N 11/04* (2013.01); *F02N 11/0848* (2013.01); *F02N 11/0851* (2013.01); *F02N 19/005* (2013.01); *F02N 99/006* (2013.01); *F02P 5/045* (2013.01); *F02P 5/153* (2013.01); *F02P 5/1506* (2013.01); *F02D 41/022* (2013.01); *F02D 41/2409* (2013.01); *F02D 2200/1004* (2013.01); *F02D 2200/1012* (2013.01); *F02N 2019/008* (2013.01); *F02N 2200/021* (2013.01); *F02N 2200/022* (2013.01); *F02N 2300/2002* (2013.01); *Y02T 10/46* (2013.01)

(58) Field of Classification Search
CPC ................ F02D 35/023; F02D 41/022; F02D 2200/1004; F02D 41/2409; F02D 2200/1012; F02P 5/153; F02P 5/1506; F02P 5/045; F02N 11/0848; F02N 11/0851; F02N 11/04; F02N 19/005; F02N 99/006; F02N 2200/022; F02N 2019/008; F02N 2200/021; F02N 2300/2002; B60W 20/40; Y02T 10/46
See application file for complete search history.

(56) References Cited

FOREIGN PATENT DOCUMENTS

| JP | 2011-201413 A | 10/2011 |
|---|---|---|
| JP | 2013-095155 A | 5/2013 |

* cited by examiner

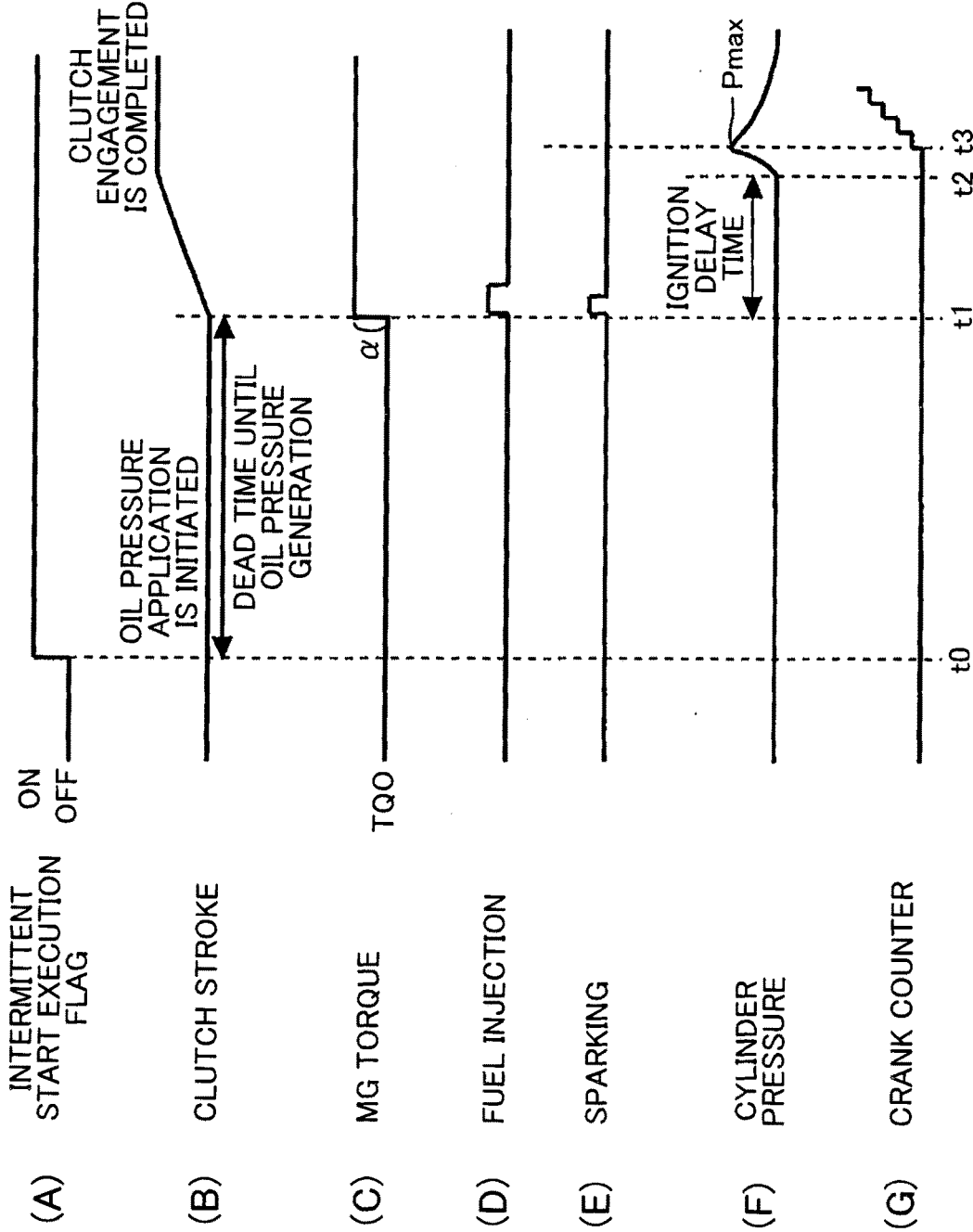

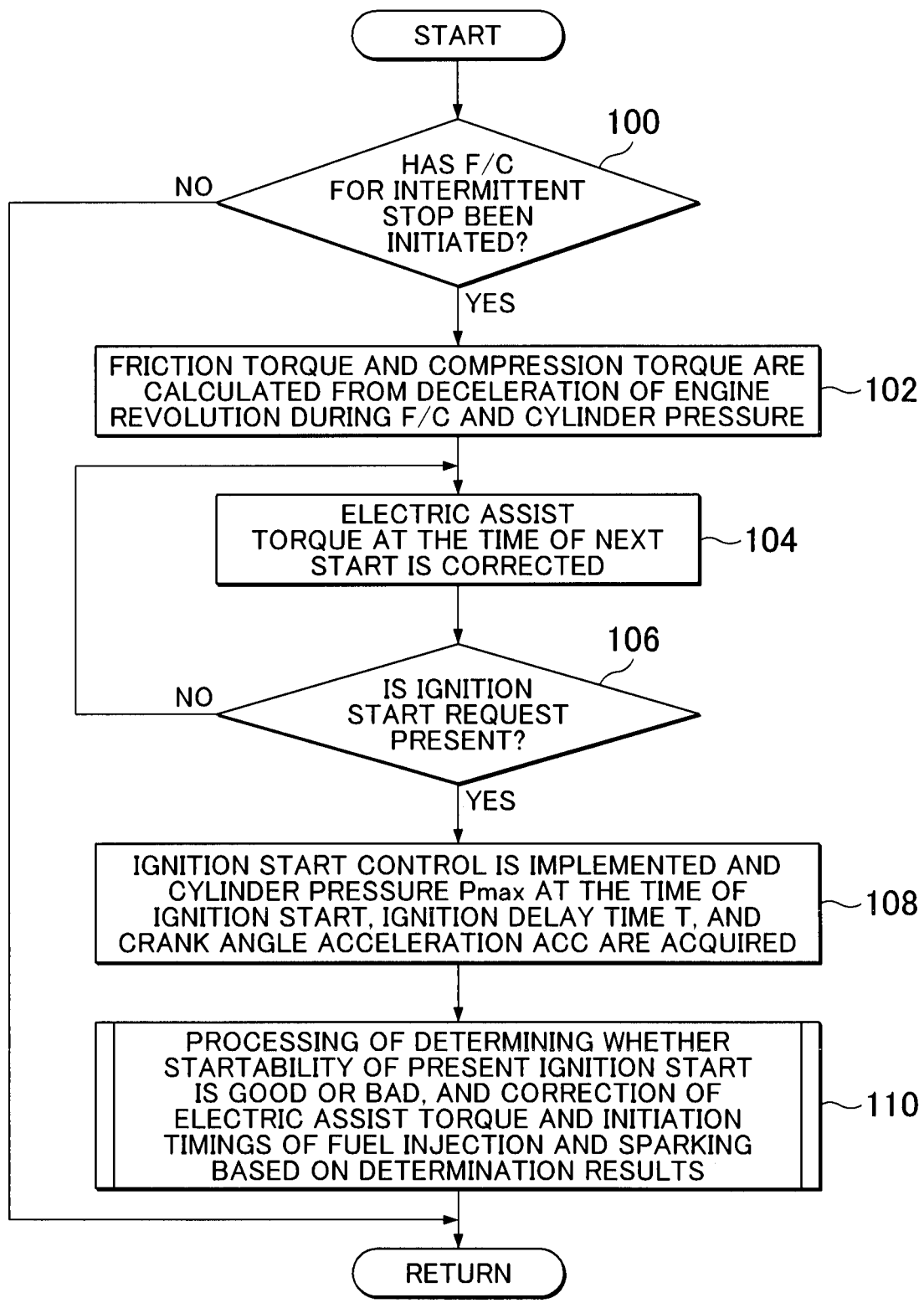

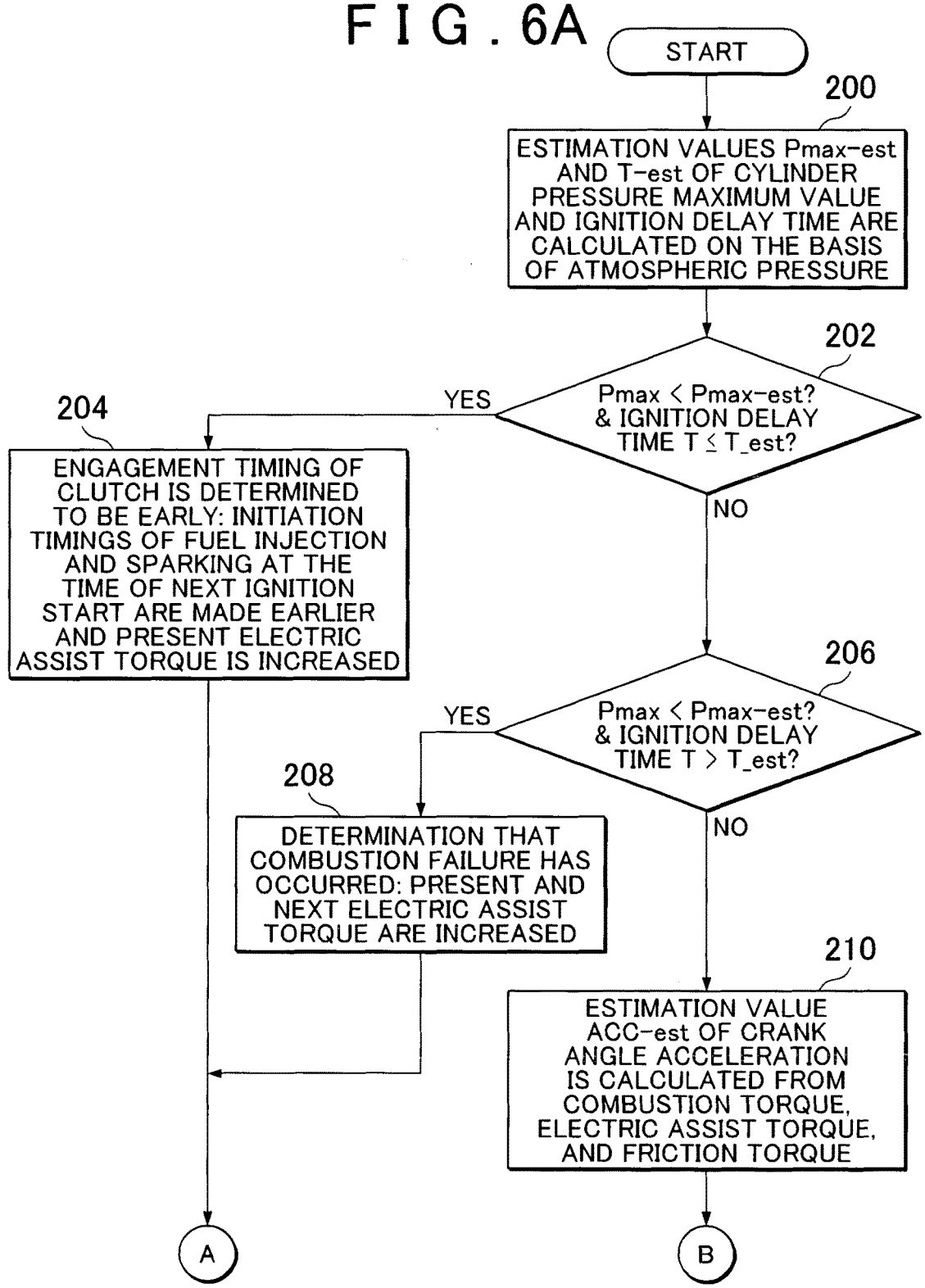

CONTROL DEVICE FOR STARTING AN ENGINE OF A VEHICLE

CROSS-REFERENCE TO RELATED APPLICATIONS

This is a national phase application based on the PCT International Patent Application No. PCT/IB2015/001278 filed Jul. 29, 2015, claiming priority to Japanese Patent Application Nos. 2014-154142 and 2015-107228 filed Jul. 29, 2014 and May 27, 2015, respectively, the entire contents of all of which are incorporated herein by reference.

BACKGROUND OF THE INVENTION

1. Field of the Invention

The invention relates to a control device for a vehicle, and a vehicle provided with the control device.

2. Description of Related Art

Japanese Patent Application Publication No. 2011-201413 (JP 2011-201413 A) discloses a drive control device for a hybrid vehicle which is provided with an internal combustion engine and an electric motor as power sources and in which a combustion start (ignition start) using expansion stroke injection is performed. In such a drive control device, when the ignition start is performed, a sparking and combustion in the internal combustion engine are initiated according to a timing at which a torque (assist torque) from a drive wheel side is applied to the internal combustion engine. More specifically, an intermittent portion configured to include a clutch element and a brake element is provided in the hybrid vehicle to connect or cut off a power transmission path between the internal combustion engine and the electric motor. Further, a torque increase in the electric motor is performed to avoid the occurrence of a torque shock caused by the torque being taken from the drive wheel side to the internal combustion engine side when the internal combustion engine is started.

SUMMARY OF THE INVENTION

In the hybrid vehicle disclosed in JP 2011-201413 A, where the timing at which the assist torque is applied from the drive wheel side to the internal portion engine and the timing of combustion torque generation in the internal combustion engine are shifted with respect to each other due to the fastening of the intermittent member, or a combustion failure occurs in the internal combustion engine, it is possible that the ignition start would not be performed satisfactorily.

The invention provides a control device for a vehicle such that stable ignition start is performed even when the timing at which the application of an electric assist torque from a motor to the crankshaft of an internal combustion engine is initiated and the combustion initiation timing are shifted with respect to each other, or a combustion failure occurs in the internal combustion engine, and also provides a vehicle provided with the control device.

A control device according to a first aspect of the invention is for a vehicle including: an internal combustion engine including: a fuel injection valve configured to inject fuel directly into a cylinder; a sparkplug configured to spark to ignite a gas mixture; a cylinder pressure sensor configured to detect a cylinder pressure; and a crank angle sensor configured to detect a crank angle; a motor configured to be capable of rotationally driving a crankshaft of the internal combustion engine; and a clutch configured to connect or cut off a power transmission path between the internal combustion engine and the motor. The control device includes an electronic control unit. The electronic control unit executes electric assist of rotation of the crankshaft by the motor in association with engagement of the clutch, at the time of an ignition start in which fuel injection and sparking are executed with respect to a target cylinder, which has been stopped in an expansion stroke, and the internal combustion engine is started. The electronic control unit acquires, with respect to a torque indication value indicating an amount of a combustion torque generated by combustion to be initially performed in the target cylinder at the time of the ignition start, an acquisition value which is based on a detection value of the cylinder pressure sensor and an estimation value which is based on a first parameter related to the torque indication value. The electronic control unit acquires, with respect to an ignition delay time which is a time from an initiation timing of sparking relating to combustion which is to be initially performed in the target cylinder at the time of the ignition start to a beginning timing of ignition, an acquisition value which is based on a detection value of the cylinder pressure sensor and an estimation value which is based on a second parameter related to the ignition delay time. The electronic control unit corrects at least one of the initiation timing of sparking which is to be initially performed in the target cylinder at the time of the ignition start and an electric assist torque which is to be used for the ignition start, on the basis of a combination of a relationship between the acquisition value and estimation value of the torque indication value and a relationship between the acquisition value and estimation value of the ignition delay time.

In the aforementioned aspect, the electronic control unit may acquire, with respect to a crank angle acceleration when the crankshaft starts to rotate at the time of the ignition start, an acquisition value based on a detection value of the crank angle sensor and an estimation value based on a third parameter related to the crank angle acceleration; and the electronic control unit may correct at least one of the initiation timing of sparking which is to be initially performed in the target cylinder at the time of the ignition start and the electric assist torque which is to be used for the ignition start, on the basis of a combination of the relationship between the acquisition value and estimation value of the torque indication value and a relationship between the acquisition value and estimation value of the crank angle acceleration.

In the aforementioned configuration, the electronic control unit may execute at least one of a retardation of the initiation timing of sparking which is to be initially performed in the target cylinder at the time of the next ignition start and an increase in the electric assist torque which is to be used in the present or next ignition start, when the acquisition value of the torque indication value is equal to or greater than the estimation value of the torque indication value and the acquisition value of the crank angle acceleration is less than the estimation value of the crank angle acceleration.

In the aforementioned configuration, in the case in which the acquisition value of the torque indication value is equal to or greater than the estimation value of the torque indication value and the acquisition value of the crank angle acceleration is less than the estimation value of the crank angle acceleration, the electronic control unit may determine that an abnormality has occurred in the clutch when, despite the increase in the electric assist torque that is to be used for the ignition start, an increase amount of the crank angle acceleration that accompanies the increase in the electric assist torque is equal to or less than a predetermined value.

In the aforementioned configuration, in the case in which the acquisition value of the torque indication value is equal to or greater than the estimation value of the torque indication value and the acquisition value of the crank angle acceleration is less than the estimation value of the crank angle acceleration, the electronic control unit may determine that an abnormality has occurred in the clutch when the number of times of the ignition start in which the initiation timing of sparking has been delayed is equal to or greater than a predetermined number of times.

In the aforementioned configuration, in the case in which the acquisition value of the torque indication value is equal to or greater than the estimation value of the torque indication value and the acquisition value of the crank angle acceleration is less than the estimation value of the crank angle acceleration, the electronic control unit may delay the initiation timing of sparking by a larger retardation correction amount as a difference between the estimation value and acquisition value of the crank angle acceleration is larger, and, in the case in which the acquisition value of the torque indication value is equal to or greater than the estimation value of the torque indication value and the acquisition value of the crank angle acceleration is less than the estimation value of the crank angle acceleration, the electronic control unit may determine that an abnormality has occurred in the clutch when the retardation correction amount is equal to or greater than a predetermined value.

In the aforementioned aspect, the electronic control unit may execute, by referring to a second map, at least one of correction of the initiation timing of sparking which is to be initially performed in the target cylinder at the time of the ignition start and correction of the electric assist torque which is to be used for the ignition start; the second map may store, as a map value, at least one of a correction amount of the initiation timing of sparking which is to be initially performed in the target cylinder at the time of the ignition start and a correction amount of the electric assist torque which is to be used for the ignition start, by using the acquisition value and estimation value of the torque indication value and the acquisition value and estimation value of the crank angle acceleration as input axes; and the second map may be provided for each first parameter and for each third parameter.

In the aforementioned aspect, the electronic control unit may execute at least one of an advance of the initiation timing of sparking which is to be initially performed in the target cylinder at the time of the next ignition start and an increase in the electric assist torque which is to be used in the present or next ignition start, in the case in which the acquisition value of the torque indication value is less than the estimation value of the torque indication value and the acquisition value of the ignition delay time is equal to or less than the estimation value of the ignition delay time.

In the aforementioned configuration, the electronic control unit may increase the electric assist torque which is to be used in the present or next ignition start, in the case in which the acquisition value of the torque indication value is less than the estimation value of the torque indication value and the acquisition value of the ignition delay time is greater than the estimation value of the ignition delay time.

In the aforementioned configuration, the electronic control unit may execute, by referring to a first map, at least one of correction of the initiation timing of sparking which is to be initially performed in the target cylinder at the time of the ignition start and correction of the electric assist torque which is to be used for the ignition start; the first map may store, as a map value, at least one of a correction amount of the initiation timing of sparking which is to be initially performed in the target cylinder at the time of the ignition start and a correction amount of the electric assist torque which is to be used for the ignition start, by using the acquisition value and estimation value of the torque indication value and the acquisition value and estimation value of the ignition delay time as input axes; and the first map may be provided for each first parameter and for each second parameter.

A vehicle according to a second aspect of the invention includes: an internal combustion engine including: a fuel injection valve configured to inject fuel directly into a cylinder; a sparkplug configured to spark to ignite a gas mixture; a cylinder pressure sensor configured to detect a cylinder pressure; and a crank angle sensor configured to detect a crank angle; a motor configured to be capable of rotationally driving a crankshaft of the internal combustion engine; a clutch configured to connect or cut off a power transmission path between the internal combustion engine and the motor; and an electronic control unit, wherein the electronic control unit executes electric assist of rotation of the crankshaft by the motor in association with engagement of the clutch, at the time of a ignition start in which fuel injection and sparking are executed with respect to a target cylinder, which has been stopped in an expansion stroke, and the internal combustion engine is started; the electronic control unit acquires, with respect to a torque indication value indicating an amount of a combustion torque generated by combustion to be initially performed in the target cylinder at the time of the ignition start, an acquisition value which is based on a detection value of the cylinder pressure sensor and an estimation value which is based on a first parameter related to the torque indication value; the electronic control unit acquires, with respect to an ignition delay time which is a time from an initiation timing of sparking relating to combustion which is to be initially performed in the target cylinder at the time of the ignition start to a beginning timing of ignition, an acquisition value which is based on a detection value of the cylinder pressure sensor and an estimation value which is based on a second parameter related to the ignition delay time; and the electronic control unit corrects at least one of the initiation timing of sparking which is to be initially performed in the target cylinder at the time of the ignition start and an electric assist torque which is to be used for the ignition start, on the basis of a combination of a relationship between the acquisition value and estimation value of the torque indication value and a relationship between the acquisition value and estimation value of the ignition delay time.

When a clutch is provided between an internal combustion engine and a motor, as in the case of the control device and vehicle according to the aspects of the invention, the timing at which the clutch starts to transmit an electric assist torque from the motor to the crankshaft after the engagement of the clutch has been initiated corresponds to the timing at which the application of the electric assist torque from the motor to the crankshaft of the internal combustion engine is initiated. According to the aspects of the invention, a shift between the engagement timing of the clutch and the combustion initiation timing and a combustion failure in the internal combustion engine can be detected by using a combination of the relationship between the acquisition value and estimation value of the torque indication value and the relationship between the acquisition value and estimation value of the ignition delay time. Further, measures for stabilizing the start time of the ignition start can be taken in the forms respectively suitable for the shift and the combustion failure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a time chart for explaining the outline of the ignition start control with the electric assist;

FIG. 4 is a flowchart of the main routine executed in Embodiment 1 of the invention;

FIG. 6A is a flowchart of the subroutine obtained by changing part of the subroutine depicted in FIG. 5, such that the subroutine is suitable when a method for determining a clutch abnormality case depicted in FIG. 7 is used;

DETAILED DESCRIPTION OF EMBODIMENTS

Figure 1:
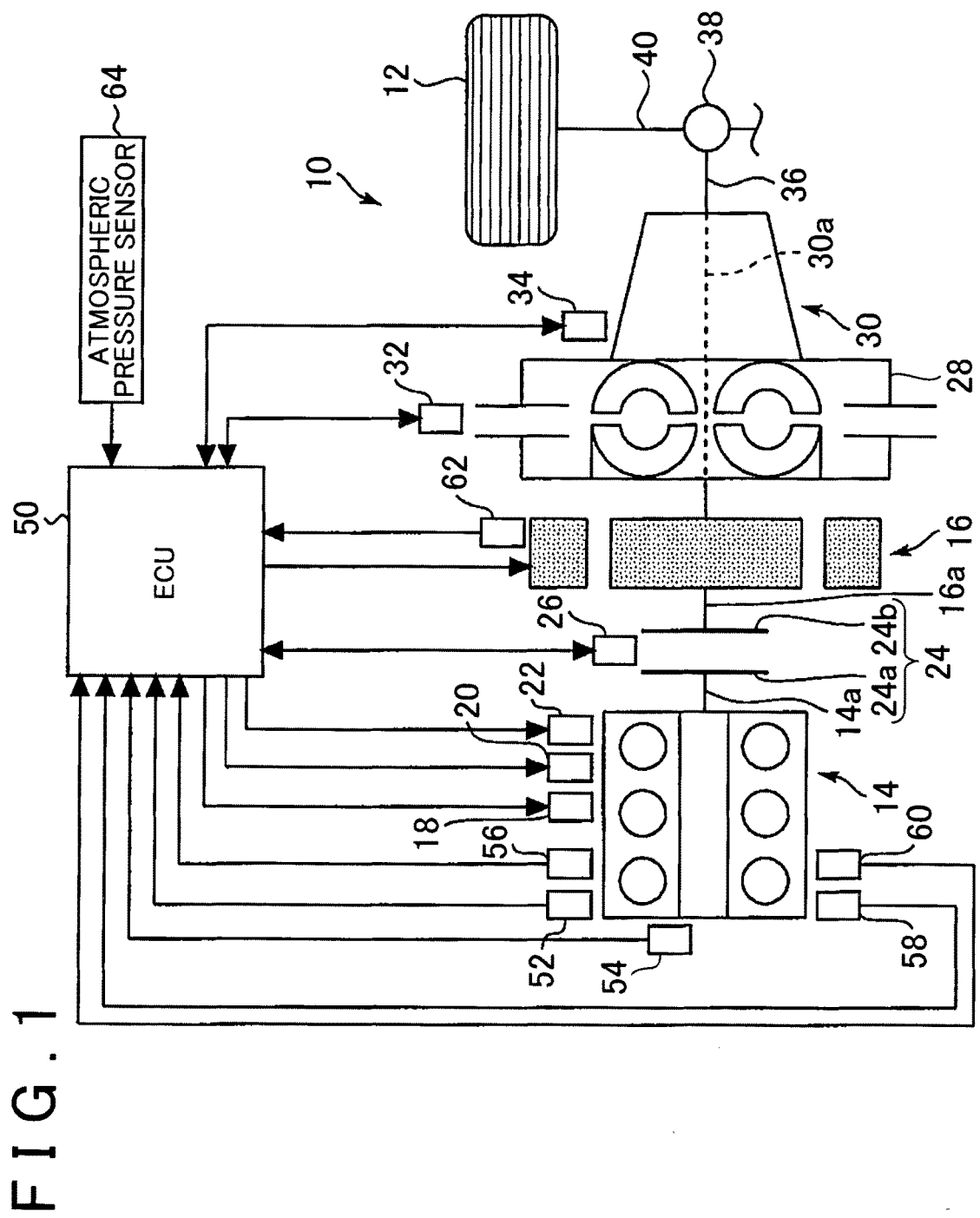
FIG. 1 illustrates the configuration of the hybrid vehicle using the control device of Embodiment 1 of the invention.

FIG. 1 depicts the configuration of a hybrid vehicle 10 using the control device of Embodiment 1 of the invention. The hybrid vehicle 10 depicted in FIG. 1 is provided with an internal combustion engine 14 and a motor generator (referred to hereinbelow simply as "MG") 16 as drive sources for driving drive wheels 12.

The internal combustion engine 14 is configured as an internal combustion engine of spark ignition type and includes a throttle valve 18, a fuel injection valve 20, and a sparkplug 22 as actuators. The throttle valve 18 adjusts the amount of air intake in the internal combustion engine 14. The fuel injection valve 20 injects fuel directly into each cylinder of the internal combustion engine 14. The sparkplug 22 sparks to ignite a gas mixture in the cylinders.

The MG 16 combines a generator function with a motor function and exchanges power with a battery through an inverter (none is depicted in the figure).

An output shaft (crankshaft) 14a of the internal combustion engine 14 is coupled through a clutch 24 to an output shaft 16a of the MG 16. The clutch 24 engages/disengages a clutch plate 24a provided on the output shaft 14a side of the internal combustion engine 14 and a clutch plate 24b provided on the output shaft 16a side of the MG 16 with an actuator 26. As a result, a power transmission path is connected/cut off between the internal combustion engine 14 and the MG 16. The actuator 26 is, for example, of a hydraulic system (more specifically, a system in which friction engagement of the clutch plate 24a and the clutch plate 24b is induced by a hydraulic cylinder (not depicted in the figure)). More specifically, where the clutch 24 is engaged, only the drive power of the internal combustion engine 14 or the drive power of the internal combustion engine 14 combined with the drive power of the MG 16 can be transmitted to the drive wheels 12. Where the clutch 24 is disengaged, only the drive power of the MG 16 can be transmitted to the drive wheels 12.

The output shaft 16a of the MG 16 is connected to an automatic transmission 30 through a torque converter 28. The torque converter 28 is a fluid clutch transmitting the rotation of the internal combustion engine 14 or the MG 16 to an output shaft 30a of the automatic transmission 30 through an oil. The torque converter 28 is provided with a lockup clutch for setting the output shaft 16a of the MG 16 and the output shaft 30a of the automatic transmission 30 to a direct connection state. The lockup clutch of the torque converter 28 is hydraulically controlled by an actuator 32. Further, the automatic transmission 30 is a device that automatically switches a gear ratio on the basis of information on a vehicle speed or the like. The automatic transmission is hydraulically controlled by an actuator 34.

A propeller shaft 36 is connected to the output shaft 30a of the automatic transmission 30. The propeller shaft 36 is connected to left and right drive shafts 40 through a differential gear 38. The drive shafts 40 are connected to the drive wheels 12.

The control device of the hybrid vehicle 10 according to the present embodiment is provided with an electronic control unit (ECU) 50. The ECU 50 is provided with, for example, a central processing unit (CPU), a storage circuit constituted by a read only memory (ROM) or random access memory (RAM), and an input/output port. Various sensors provided in the hybrid vehicle 10 are connected to the input port of the ECU 50. More specifically, an air flowmeter 52 for measuring an intake air amount, a crank angle sensor 54 for detecting a crank angle and an engine revolution speed, a cylinder pressure sensor 56 for detecting the pressure inside each cylinder, a water temperature sensor 58 for detecting the temperature of cooling water of the internal combustion engine 14, and an oil temperature sensor 60 for detecting the temperature of lubricating oil in the internal combustion engine 14 are mounted on the internal combustion engine 14. A MG revolution speed sensor 62 for detecting a motor revolution speed is mounted on the MG 16. Further, an atmospheric pressure sensor 64 that detects the atmospheric pressure is also connected to the input port of the ECU 50. A sparking device using the abovementioned throttle valve 18, fuel injection valve 20, and sparkplug 22, and various actuators such as the actuators 32 and 34 are connected to the output port of the ECU 50. The ECU 50 processes the input signals of the sensors and operates the actuators according to a predetermined control program, thereby controlling, for example, the drive of the internal combustion engine 14, the drive of the MG 16, the engagement operation of the clutch 24, the operation of the lockup clutch of the torque converter 28, and the gear ratio and shift timing of the automatic transmission 30, all of the abovementioned units being provided in the hybrid vehicle 10. In addition to those depicted in the figure, there are many other actuators and sensors connected to the ECU 50, but the explanation thereof in the present description is omitted.

In order to reduce fuel consumption, exhaust gas emission, etc., the hybrid vehicle 10 of the above-described configuration is provided with an engine intermittent start function. The engine intermittent start function automatically stops the internal combustion engine 14, while the vehicle system is activated (more specifically, while the vehicle runs or is temporarily stopped), when there is no request to the internal combustion engine 14 to generate a vehicle drive torque and also no request to charge the battery that supplies electrical power to the MG 16 as the vehicle runs, and then restarts the internal combustion engine 14 when a restart request is confirmed.

In the hybrid vehicle 10, when the internal combustion engine 14 is restarted after the internal combustion engine 14 has been automatically stopped, a start method (referred to hereinbelow as "ignition start") is used such that fuel injection and sparking are performed with respect to a cylinder that has been stopped in the expansion stroke where the intake and exhaust valves are both closed (referred to hereinbelow as a "target cylinder"), combustion is thus generated in the cylinder, and the crankshaft 14a is rotationally driven by the combustion energy, thereby starting (restarting) the internal combustion engine 14. As a result, power consumption can be suppressed by comparison with the restart using the motor which functions as a starter motor, and therefore fuel efficiency can be further improved.

Further, in the hybrid vehicle 10 of the present embodiment, the MG 16 is caused to function as a motor and assist the rotation of the crankshaft 14a at the time of the ignition start (referred to hereinbelow as "electric assist") in order to realize the ignition start reliably.

FIG. 2 is a time chart for explaining the outline of the ignition start control with the electric assist. More specifically, FIG. 2 illustrates the operations in the abovementioned target cylinder in which combustion is initially performed at the time of the ignition start. In the example depicted in FIG. 2, an intermittent start execution flag is set ON at a timing t0. For example, there is a case in which the ignition start is possible even without the electric assist, as in the case in which the restart is performed immediately after an automatic stop. However, in this case, the intermittent start execution flag is assumed to be set ON when a request to perform the engine intermittent start by using the ignition start with the electric assist has been issued.

Where the intermittent start execution flag is set ON, the application of the oil pressure necessary for engaging the clutch 24 is initiated. In the hydraulic clutch 24, there is a response delay from after the application of the oil pressure is initiated until when the oil pressure actually acts upon the clutch 24 and the clutch 24 starts operating. A period of time from the oil pressure application initiation timing t0 to an engagement initiation timing t1 of the clutch 24 in FIG. 2 is a dead time (t1-t0) required to generate an oil pressure in the clutch 24. In the ignition start of the present embodiment, the dead time (t1-t0) is determined in advance, and fuel injection and sparking in the target cylinder are basically initiated at the timing t1 after the dead time (t1-t0) has elapsed. However, the initiation timing of at least the sparking, from among the initiation timings of sparking and fuel injection, is corrected, as necessary, by the below-described control. Since the pressure inside the stopped target cylinder is substantially the atmospheric pressure, the cylinder is filled with the air in an amount corresponding to the stroke volume under such a pressure. Therefore, the amount of fuel injected into the target cylinder is determined according to the stroke volume in the stopped target cylinder. In the case of using a high-response clutch in which, by contrast with the hydraulic clutch 24, the dead time (t1-t0) does not occur or substantially does not occur, fuel injection and sparking may be initiated immediately after the intermittent start execution flag has been set ON.

The time required to complete the engagement of the clutch 24 after the engagement has been initiated can be adjusted by adjusting the oil pressure applied to the clutch 24. Further, the approximate time required to cause the ignition after the sparking has been initiated in the target cylinder where the combustion is initiated at the time of a ignition start can be determined in advance by tests, or the like. Therefore, the approximate combustion initiation timing in the target cylinder can be predicted from the initiation timing of sparking. For this reason, applied to the clutch 24 is the oil pressure which has been adjusted such that the application of the electric assist torque to the crankshaft 14a through the clutch 24 is started at the predicted timing of combustion occurrence after ignition.

Further, in order to perform the electric assist, the torque generated by the MG 16 (referred to hereinbelow as a "MG torque") is increased at the timing t1 (that is, synchronously with the engagement initiation of the clutch 24). More specifically, where the vehicle runs by using the MG 16 as a power source, the MG torque is increased by an electric assist torque α with respect to a base value TQ0, which is necessary to run the vehicle, at the timing t1. Further, while the vehicle is temporarily stopped, the MG 16 generates a torque necessary to induce a creep effect by using the torque converter 28, and the MG 16 rotates. Therefore, when the ignition start is performed while the vehicle is temporarily stopped, this torque corresponds to the base value TQ0, and in this case, the MG torque is also increased by the electric assist torque a with respect to a base value TQ0 at the timing t1. Thus, in the present embodiment, when the ignition start is electrically assisted as the drive system of the vehicle is activated, the engagement of the clutch 24 is performed in a state where the rotating MG 16 is rotating, regardless of whether the vehicle runs or is temporarily stopped. In a vehicle which is not provided with the torque converter 28, where a device capable of partially or entirely cutting off the transmission of power, such as a clutch, is provided in a region on the drive wheel 12 side with respect to the MG 16 in the power transmission path, the ignition start with the electric assist can be also performed from the state in which the MG 16 is rotated while the vehicle is temporarily stopped, in the same manner as described hereinabove. The application of the electric assist to the crankshaft 14a is continued until the internal combustion engine 14 can operate independently. Further, the ignition start is completed when the internal combustion engine 14 can operate independently. The ignition start, which is the object of the invention, is not necessarily limited to a mode in which the ignition start is initiated from a state in which the base value TQ0 is not zero, as described hereinabove, and may be also initiated from a state in which the base value TQ0 is zero, that is, in a mode in which the MG torque rises from zero at the timing t1 so that the desired electric assist torque could be obtained.

The ignition is realized in the expansion stroke by initiating fuel injection and sparking in the target cylinder at the timing t1. Where the ignition is realized and combustion is initiated by the sparking operation, the cylinder pressure starts to rise as depicted in FIG. 2F (timing t2). Then, the cylinder pressure continues rising, but the torque (a sum of the combustion torque and assist torque) acting upon the crankshaft 14*a* exceeds the friction torque of the internal combustion engine 14, whereby a piston (crankshaft 14*a*) starts to move (timing t3). As a result, the cylinder pressure which has been raised by the combustion starts to lower due to the reduction in the stroke volume resulting from the piston being pushed down. Therefore, a maximum value Pmax of the cylinder pressure (combustion pressure) is obtained close to the timing t3. FIG. 2G illustrates the transition in the crank counter value. The crank counter counts, for each predetermined crank angle, a variation amount of the crank angle detected by the crank angle sensor 54. The count in the crank counter is initiated at the timing t3 at which the crankshaft 14*a* starts to move. In this case, as depicted in FIG. 2E, an example is considered in which a sparking coil is energized once to induce the sparking in the target cylinder, but the ON-OFF energization for sparking may be executed repeatedly a predetermined number of times with a predetermined period.

In order to better establish the ignition start with the electric assist, it is important that the piston of a cylinder in which the combustion is scheduled to be performed after the target cylinder (that is, the cylinder that has stopped in the compression stroke) could reliably go over the compression top dead center under the effect of the rotation torque of the crankshaft 14*a* which is obtained by the cooperation of the combustion torque in the target cylinder and the electric assist torque. The reason therefor is explained below. Thus, this cylinder is filled with a moderate amount of air, and the combustion is performed in a state in which the gas inside the cylinder is compressed. Therefore, where the piston of the cylinder goes over the compression top dead center, a moderate explosive power can be expected to be generated.

In order to realize the combustion in the cylinder in which the combustion is scheduled to proceed after the target cylinder, it is necessary to ensure appropriate synchronization of the timing at which the electric assist torque is applied to the crankshaft 14*a* and the combustion initiation timing of the target cylinder. The electric assist torque is applied to the crankshaft 14*a* in the present drive system through the clutch 24 disposed in a region between the internal combustion engine 14 and the MG 16 in the power transmission path. Therefore, ensuring the abovementioned synchronization in the present drive system means ensuring the synchronization between the engagement timing of the clutch 24 and the combustion initiation timing of the target cylinder. The "engagement timing" of the clutch 24, as referred to herein, is the timing at which the clutch 24 starts transmitting part of the MG torque to the crankshaft 14*a* after the engagement of the clutch 24 has been initiated.

As mentioned hereinabove, it is important to ensure the appropriate synchronization of the engagement timing of the clutch 24 and the combustion initiation timing. However, there is a variation in the abovementioned dead time (t1-t0) relating to oil pressure application to the clutch 24 and also there is a variation in the time from the initiation to the completion of engagement of the clutch 24. Furthermore, there is a variation in the combustion initiation timing of the target cylinder and the instruction timings of control operations depicted in FIG. 2.

Figure 3A:
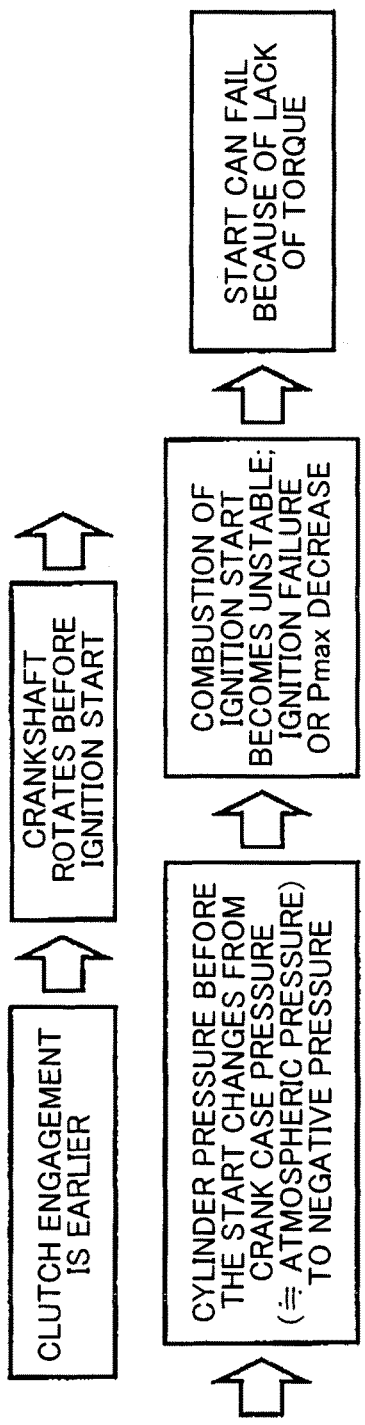
FIG. 3A illustrates problems encountered when the engagement of the clutch is earlier than the initiation of combustion due to various variations.

FIG. 3 illustrates problems encountered when the engagement timing of the clutch 24 and the combustion initiation timing shift from each other due to abovementioned variations. More specifically, FIG. 3A relates to the case in which the engagement timing of the clutch 24 is earlier than the combustion initiation timing. In this case, since the clutch 24 is engaged in advance of the combustion initiation, the crankshaft 14*a* starts to rotate, under the effect of the electric assist torque, before the ignition begins. When the intake and exhaust valves are closed, the pressure inside the stopped cylinder (target cylinder) is equal to the pressure inside the crankcase (substantially equal to the atmospheric pressure). As a result of the piston being lowered by the drive by the electric assist torque from this state, the cylinder pressure temporarily becomes negative. Further, as a result of the stroke volume at the time of sparking enlarging with respect to the stroke volume during the automatic stop due to such changes in the piston position, the injection of fuel in an amount determined according to the stroke volume during the automatic stop becomes inappropriate (becomes small) for the stroke volume at the time of sparking. As a consequence, the combustion becomes unstable. Where the combustion becomes unstable, a ignition failure occurs, or the maximum value Pmax of the cylinder pressure decreases. In order to perform a smooth injection start by using the electric assist, it is necessary to ensure appropriately the torque which is a sum of the combustion torque and the electric assist torque. Therefore, in this case, a start failure can occur due to a lack of combustion torque caused by combustion destabilization.

Figure 3B:
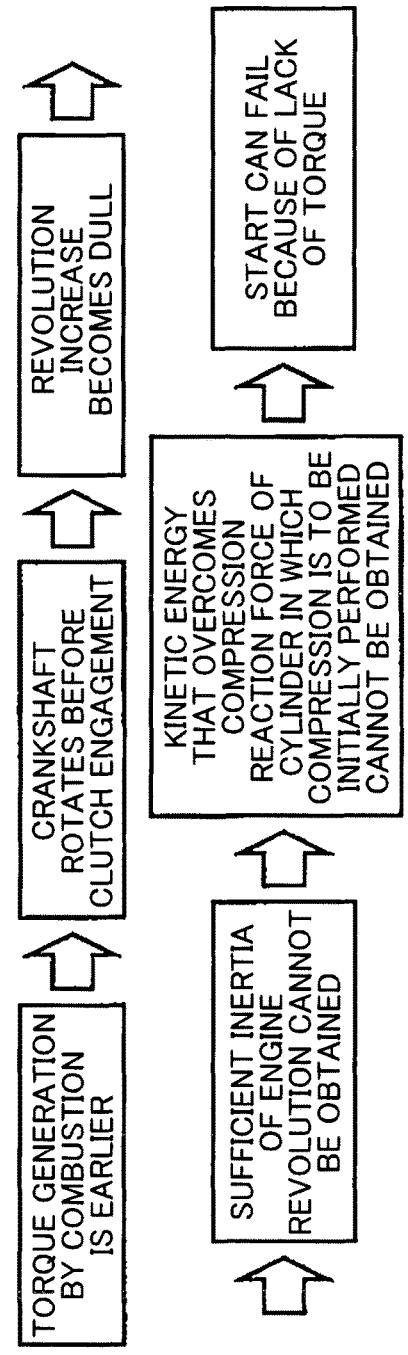
FIG. 3B illustrates problems encountered when the engagement of the clutch is later than the initiation of combustion due to various variations.

Meanwhile, FIG. 3B illustrates the case in which the engagement timing of the clutch 24 is later than the combustion initiation timing. In this case, as a result of the combustion torque being generated in advance of the engagement of the clutch 24, the crankshaft 14*a* starts rotating before the engagement of the clutch 24 under the effect of the combustion torque. As a consequence, since no electric assist is involved, the rotation rise of the crankshaft 14*a* becomes dull and sufficient inertia of rotation of the crankshaft 14*a* cannot be obtained. Under such circumstances, the kinetic energy that overcomes a reaction force acting when the gas is compressed in the cylinder in which the compression stroke is to be initially performed (that is, the cylinder in which the combustion is scheduled to proceed after the target cylinder) cannot be obtained. Therefore, in this case, the torque is insufficient at a timing at which the torque is indispensable for obtaining the sufficient inertia of rotation of the crankshaft 14*a*, and this is why a start failure can occur.

The ignition start can fail not only in the two cases explained hereinabove with reference to FIG. 3, namely, the first case in which the engagement timing of the clutch 24 is earlier than the combustion initiation timing, and the second case in which the engagement timing of the clutch 24 is later than the combustion initiation timing. Thus, there is also a third case in which a combustion failure has occurred in the internal combustion engine 14. Therefore, in order to prevent the ignition start from a failure, it is necessary to detect those three cases separately and take measures against each of the cases.

In the present embodiment, whether the present ignition start corresponds to any of the abovementioned three cases or corresponds to none of them is determined at a timing after the combustion in the target cylinder has ended in the course of executing the ignition start. The cylinder pressure maximum value Pmax of the target cylinder, an ignition delay time T, and a crank angle acceleration ACC are monitored to make the determination. The cylinder pressure maximum value Pmax is the maximum value of the cylinder pressure at the time of pressure increase which follows the initial combustion in the target cylinder, and this value is acquired using the cylinder pressure sensor 56. The ignition delay time T is a period of time from the initiation timing of sparking in the target cylinder (the timing t1 in FIG. 2) to the ignition timing (beginning timing of ignition). The ignition timing can be acquired by using a cylinder pressure rise timing (the timing t2 in FIG. 2) which is detected by the cylinder pressure sensor 56. However, since the cylinder pressure rise timing is difficult to estimate, the timing at which the cylinder pressure maximum value Pmax is obtained (the timing t3 in FIG. 2) can be used instead of the cylinder pressure rise timing to calculate the ignition delay time T. Further, the crank angle acceleration ACC is a crank angle acceleration when the crankshaft 14a starts to rotate at the time of the ignition start and is calculated by using a value acquired by the crank angle sensor 54.

Features and specific detection methods relating to each of the above-described three cases will be explained hereinbelow. Initially, the first case is explained. In the first case, the rotation of the crankshaft 14a starts at a timing earlier than the ignition timing predicted from the initiation timing of sparking. Further, in this case, the combustion torque becomes lower than that when the normal ignition start has been performed, in spite of the ignition timing itself being normal. Therefore, in this case, the cylinder pressure maximum value Pmax becomes lower than that when the normal ignition start has been performed, but the ignition delay time T is not delayed.

Accordingly, in the present embodiment, when the cylinder pressure maximum value Pmax calculated on the basis of the detection value of the cylinder pressure sensor 56 is less than an estimation value Pmax-est and the ignition delay time T is equal to or less than an estimation value T-est, it is determined that the present ignition start corresponds to the first case. The estimation value Pmax-est corresponds to the normal lower limit value which is the lower limit value of the range of the cylinder pressure maximum value Pmax that can be obtained when the ignition start is performed normally. In this case, an estimation value is used which is based on the atmospheric pressure during the engine automatic stop which is detected by the atmospheric pressure sensor 64. The estimation value T-est corresponds to the normal upper limit value which is the upper limit value of the range of the ignition delay time T that can be obtained when the ignition start is performed normally. In this case, an estimation value is used which is based on the atmospheric pressure during the engine automatic stop which is detected by the atmospheric pressure sensor 64. The case in which the normal ignition start is performed, as referred to herein, is the case in which the engagement timing of the clutch 24 and the combustion initiation timing are not shifted with respect to each other and a combustion torque within a normal range is obtained in the initial combustion in the target cylinder.

In the second case, the crank angle acceleration ACC decreases in spite of the ignition timing and combustion torque being normal. Accordingly, in the present embodiment, when the cylinder pressure maximum value Pmax is equal to or greater than the estimation value Pmax-est and the crank angle acceleration ACC is less than an estimation value ACC-est, it is determined that the present ignition start corresponds to the second case. The estimation value ACC-est corresponds to the normal lower limit value which is the lower limit value of the range of the crank angle acceleration ACC which can be obtained when the ignition start is performed normally. In this case, an estimation value is used which is based on the combustion torque generated by the combustion initially performed in the target cylinder, the electric assist torque used in the present ignition start, and the friction torque of the internal combustion engine 14.

However, the cylinder pressure maximum value Pmax is equal to or greater than the estimation value Pmax-est and the crank angle acceleration ACC is less than an estimation value ACC-est not only in the second case, but also when an abnormality has occurred in the clutch 24 (referred to hereinbelow as a "clutch abnormality case"). The clutch abnormality case, as referred to herein, is more specifically the case in which an abnormality has occurred in power transmission in the clutch 24, such as the case in which the clutch 24 has degraded or the clutch 24 slips easily due to wear of the clutch plates 24a, 24b.

Accordingly, in the present embodiment, the following method is used to determine whether the present ignition start corresponds to the second case or the clutch abnormality case. Thus, where an abnormality has occurred in power transmission in the clutch 24, even when the electric assist torque is increased, an increase in the crank angle acceleration ACC corresponding to the increased electric assist torque cannot be expected. Accordingly, in the present embodiment, it is determined that an abnormality has occurred in power transmission in the clutch 24 when the amount of increase in the crank angle acceleration ACC which follows the increase in the electric assist torque is equal to or less than a predetermined value even when the electric assist torque which is used in the present ignition start is increased when the cylinder pressure maximum value Pmax is equal to or greater than the estimation value Pmax-est and the crank angle acceleration ACC is less than an estimation value ACC-est.

In the third case, the ignition timing is delayed and the combustion torque decreases. Accordingly, in the present embodiment, it is determined that the present ignition start corresponds to the third case when the cylinder pressure maximum value Pmax is less than the estimation value Pmax-est and the ignition delay time T is longer than the estimation value T-est.

In the case which is determined not to correspond to any of the first to third cases, it is determined that the present ignition start is normal (that is, there is no shift between the engagement timing of the clutch 24 and the combustion initiation timing, and the combustion torque within the normal range is obtained in the initial combustion in the target cylinder).

When the present ignition start corresponds to the first case, that is, when the engagement timing of the clutch 24 is earlier than the combustion initiation timing, at least the initiation timing of sparking, from among the initiation timings of sparking and fuel injection which are to be initially performed in the target cylinder at the time of the next ignition start, is made earlier than the timing used for the present ignition start under the condition that it is not earlier than the initiation timing of fuel injection. The initiation timing of sparking, as referred to herein, is more specifically the initiation timing of electric discharge and can be adjusted by adjusting the energization timing of the sparking coil. More specifically, where the sparking is initiated together with fuel injection, as in the example depicted in FIG. 2, the initiation timings of both the sparking and the fuel injection are made earlier. Meanwhile, where the sparking is initiated at a timing delayed with respect to the fuel injection, by contrast with the example depicted in FIG. 2, only the initiation timing of sparking may be made earlier, provided that the initiation timing of sparking is not earlier than the initiation timing of fuel injection even when the sparking timing is made earlier. In other words, it is considered that even when at least the initiation timing of sparking, from among the initiation timings of fuel injection and sparking, is corrected and made earlier, as mentioned hereinabove, the initiation timing of sparking (electric discharge) matches or follows the initiation timing of fuel injection.

Further, when the electric assist torque is corrected, the correction can sometimes be reflected in the present ignition start, by contrast with the correction of the initiation timings of fuel injection and sparking described hereinabove. Therefore, when the present ignition start corresponds to the first case, the electric assist torque which is to be used in the present ignition start is increased over the value which has been used in the previous ignition start, provided that there is a sufficient MG torque. However, the correction of the electric assist torque when the present ignition start corresponds to the first case may be also executed by taking the next ignition start or the present and next ignition starts as a target.

When the present ignition start corresponds to the second case, that is, when the engagement timing of the clutch 24 is delayed with respect to the combustion initiation timing, at least the initiation timing of sparking, from among the initiation timings of sparking and fuel injection which are to be initially performed in the target cylinder at the time of the next ignition start, is delayed with respect to the timing used in the present ignition start. More specifically, in the ignition start, the sparking is initiated basically together with the fuel injection, as in the example depicted in FIG. 2, and therefore the initiation timings of sparking and fuel injection are delayed. However, only the initiation timing of sparking may be delayed. Further, when the present ignition start corresponds to the second case, the electric assist torque which is to be used in the present ignition start is increased over the value that has been used in the previous ignition start, provided that there is a sufficient MG torque. However, the correction of the electric assist torque when the present ignition start corresponds to the second case may be also executed by taking the next ignition start or the present and next ignition starts as a target.

When the present ignition start corresponds to the third case, that is, when a combustion failure has occurred in the internal combustion engine 14, the electric assist torque which is to be used in the present ignition start is increased over the value that has been used in the previous ignition start, provided that there is a sufficient MG torque. Further, in this case, since a lack of torque is also a concern in the next ignition start, the electric assist torque which is to be used in the next ignition start is also increased over the value that has been used in the previous ignition start. In order to ensure reliably a margin for the increase in the electric assist torque at the time of the next ignition start, the upper limit value of the MG torque that can be used to run the vehicle may be lowered. However, the correction of the electric assist torque when the present ignition start corresponds to the third case may be also executed by taking only the present ignition start or only the next ignition start as a target.

Figure 5A:
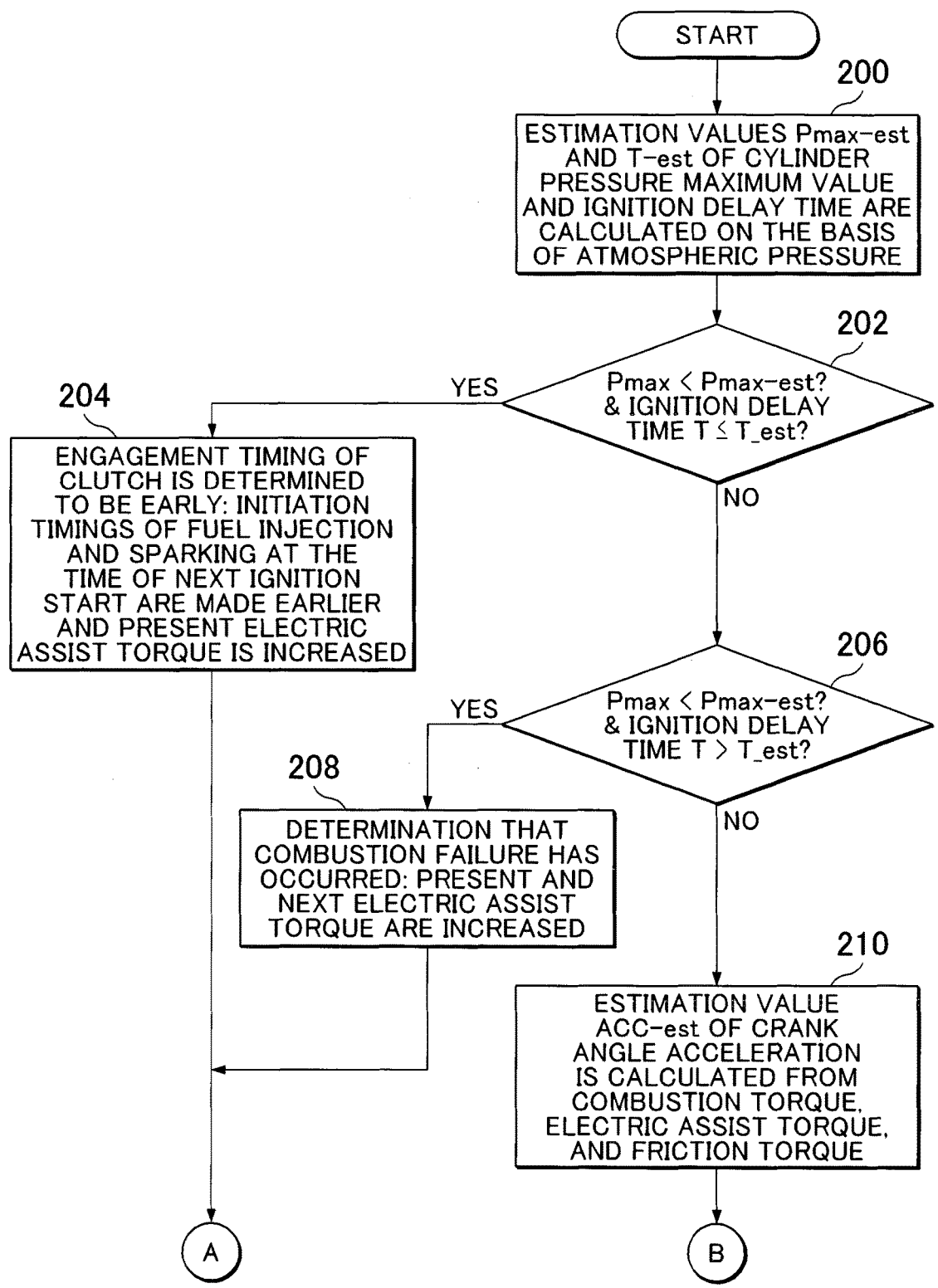
FIG. 5A is a flowchart of the subroutine executed in Embodiment 1 of the invention.
Figure 5B:
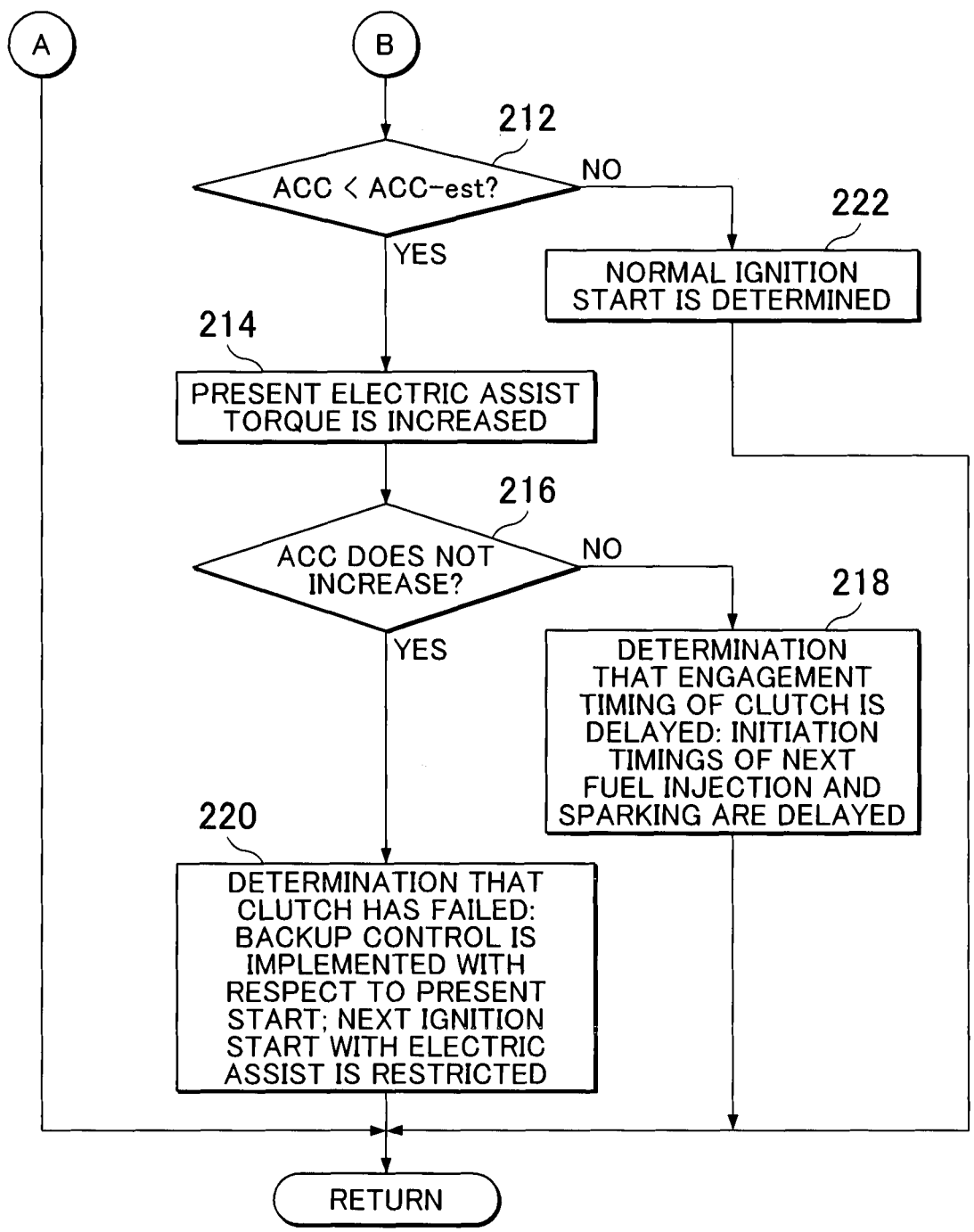
FIG. 5B is a flowchart of the subroutine executed in Embodiment 1 of the invention.

FIG. 4 is a flow chart illustrating the main routine executed by the ECU 50 in order to realize the ignition start control with the electric assist. FIG. 5 is a flowchart illustrating a subroutine that defines the processing of determining whether the startability of the present ignition start is good or bad and the correction processing relating to the ignition start which is based on the results of the determination. In the subroutine depicted in FIG. 5, a processing example is considered in which the initiation timings of both the fuel injection and the sparking are corrected. Further, as explained hereinbelow, according to the processing of the main routine depicted in FIG. 4, the processing of the subroutine depicted in FIG. 5 is performed each time the ignition start with the electric assist is performed. Where, by contrast with this processing, the processing of the subroutine depicted in FIG. 5 is not performed each time the ignition start with the electric assist is performed, the below-described correction of the initiation timing of the sparking, or the like, and the electric assist torque may be applied not only to the next ignition start, but also to the ignition starts thereafter.

In the main routine depicted in FIG. 4, the ECU 50 initially determines whether or not a fuel cut (F/C) of the internal combustion engine 14 for an intermittent stop by the engine intermittent start function has been initiated (step 100).

Where a positive determination is made in step 100, the ECU 50 advances to step 102 and calculates the friction torque and compression torque of the internal combustion engine 14 on the basis of the cylinder pressure and the deceleration of engine revolution during the fuel cut (step 102). More specifically, the deceleration of engine revolution can be calculated as a variation amount of engine revolution speed, which decreases following the execution of the fuel cut, by using the crank angle sensor 54. Further, the friction torque can be calculated as a product of the deceleration of engine revolution and the inertia around the crankshaft 14a. The inertia is a constant value inherent to the internal combustion engine 14. In this case, it is assumed to be stored in the ECU 50.

The compression torque can be calculated on the basis of the behavior of the cylinder pressure within a period of time in which the engine revolution speed decreases following the execution of the fuel cut (more specifically, the maximum value Pmax of the cylinder pressure in a certain cycle), by using the cylinder pressure sensor 56. By performing such calculation with respect to each cylinder, it is possible to calculate the compression torque for each cylinder. A compression torque acting upon the crankshaft 14a as a counter-torque when the compression of gas inside the cylinder is initiated at the time of the ignition start in the cylinder that has been stopped in the compression stroke is basically a constant value when the internal combustion engine 14 is a new product. However, where a compression leak of the cylinder gas occurs, for example, due to wear of a piston ring, the compression torque somewhat decreases. The compression torque in the course of implementing the fuel cut is calculated by the processing of the present step 102 and the calculated value is compared with a value in the same state when the internal combustion engine 14 is a new product, thereby making it possible to determine the state of the compression torque at the time of the ignition start as compared with the new product state.

Then, the ECU 50 corrects the electric assist torque at the time of the next ignition start (that is, at the time of restart from the present intermittent stop) on the basis of the friction torque and compression torque calculated in step 102 (step 104). More specifically, the ECU 50 stores the base value of the electric assist torque which is used when the friction torque and compression torque are in the respective standard states. Where the calculated friction torque is larger than the value in the standard state, the electric assist torque is corrected to increase by an amount corresponding to the difference between those values. Conversely, where the calculated friction torque is less than the value in the standard state, the electric assist torque is corrected to decrease by an amount corresponding to the difference between those values. Likewise, where the calculated compression torque is larger than the value in the standard state, the electric assist torque is corrected to increase by an amount corresponding to the difference between those values. Conversely, where the calculated compression torque is less than the value in the standard state, the electric assist torque is corrected to decrease by an amount corresponding to the difference between those values. Considered herein is an example in which the electric assist torque is corrected on the basis of both the friction torque and the compression torque, but the correction may be also performed only on the basis of the friction torque.

Then, the ECU 50 determines whether or not a ignition start execution request is present (step 106). The ignition start execution request is issued when a vehicle drive torque which cannot be ensured by the MG torque alone is required as the vehicle runs, or when the charge rate of the battery that supplies power for driving the MG 16 is equal to or less than a predetermined value.

When it is determined in step 106 that the ignition start request is present, the ECU 50 sets ON the intermittent start execution flag and implements the ignition start control (step 108). More specifically, the ignition start control basically involves applying an oil pressure to the clutch 24, executing the fuel injection and sparking, and increasing the MG torque at the respective timings represented in the example depicted in FIG. 2. In addition, the correction of the electric assist torque or the initiation timing of sparking, or the like, at the time of the next ignition start is executed, as necessary, by the processing of the below-described step 110 (the processing of the subroutine depicted in FIG. 5).

Further, in step 108, the ECU 50 acquires, by using the cylinder pressure sensor 56, the maximum value Pmax of the cylinder pressure which has increased following the initial combustion in the target cylinder at the time of the present ignition start, acquires, by using the cylinder pressure sensor 56, the ignition delay time T from the initiation timing of sparking in the target cylinder to the ignition timing, and acquires, by using the crank angle sensor 54, the crank angle acceleration ACC when the crankshaft 14a started to rotate at the time of the ignition start. More specifically, the cylinder pressure maximum value Pmax in this case can be acquired by using the maximum value of the cylinder pressure acquired with time synchronization by using the cylinder pressure sensor 56 in a predetermined period of time after the initiation of sparking in the target cylinder. The predetermined period of time is a value determined in advance by assuming the timing at which the initial explosion is expected to be performed in the target cylinder after the initiation of the sparking.

Then, the ECU 50 advances to step 110 and executes the processing of the subroutine depicted in FIG. 5. Thus, the timing at which the ECU 50 executes the processing of the subroutine depicted in FIG. 5 is the timing immediately after the acquisition of the cylinder pressure maximum value Pmax and the ignition delay time T in the target cylinder at the time of the ignition start and the acquisition of the crank angle acceleration ACC.

In the subroutine depicted in FIG. 5, the ECU 50 initially calculates the estimation values Pmax-est and T-est of the cylinder pressure maximum value and ignition delay time, respectively, on the basis of the atmospheric pressure (step 200). More specifically, the atmospheric pressure to be used in the processing of the present step 200 can be, for example, a value acquired, by using the atmospheric pressure sensor 64, during the automatic stop before the present automatic start is initiated. A relationship between the atmospheric pressure and the estimation value Pmax-est and a relationship between the atmospheric pressure and the estimation value T-est are stored as respective maps in the ECU 50. In the present step 200, the ECU 50 calculates the estimation value Pmax-est such that a larger value is assumed at a higher atmospheric pressure and calculates the estimation value T-est such that a smaller value is assumed at a higher atmospheric pressure by referring to those maps.

Then, the ECU 50 determines whether or not the cylinder pressure maximum value Pmax acquired in step 108 is less than the estimation value Pmax-est (normal lower limit value) and whether or not the ignition delay time T acquired in step 108 is equal to or less than the estimation value T-est (normal upper limit value), that is, whether or not the cylinder pressure maximum value Pmax has deviated from the normal range and whether or not the ignition delay time T is within the normal range (step 202). Where a positive determination is made in the present step 202, the ECU 50 determines that the engagement timing of the clutch 24 is earlier than the combustion initiation timing (first case) (step 204). Further, in step 204, the ECU 50 issues to the MG 16 a command to expedite the initiation timings of fuel injection and sparking which are to be initially performed in the target cylinder at the time of the next ignition start and to increase the electric assist torque which is to be used in the present ignition start. More specifically, the initiation timings may be made earlier by a predetermined value than the present value. For example, the initiation timings may be made earlier to a larger degree as the difference between the estimation value Pmax-est and the cylinder pressure maximum value Pmax is larger (that is, as the decrease amount of the cylinder pressure maximum value Pmax with respect to the value during normal operation is larger). Likewise, the electric assist torque may be increased by a predetermined amount with respect to the present value, or for example, the increase in electric assist torque may be larger as the abovementioned difference is larger. In addition, in the initial explosion in the ignition start, the combustion starts and ends while the crank angle does not change so much, by contrast with the combustion during the usual operation. As a result, the cylinder pressure maximum value Pmax is the representative value of combustion torque. Therefore, it can be said that the correction amount of the electric assist torque can be appropriately set on the basis of the abovementioned difference relating to the cylinder pressure maximum value Pmax. This increase in the electric assist torque is rapidly executed at a timing at which the processing of the present routine starts to proceed (that is, immediately after the end of the initial explosion in the ignition start).

Meanwhile, where a negative determination is made in step 202, the ECU 50 then determines whether the cylinder pressure maximum value Pmax acquired in step 108 is less than the estimation value Pmax-est (normal lower limit value) and whether the ignition delay time T acquired in step 108 is longer than the estimation value T-est (normal upper limit value), that is, whether the cylinder pressure maximum value Pmax and the ignition delay time T have deviated from the respective normal ranges (step 206). Where a positive determination is made in the present step 206, the ECU 50 determines that a combustion failure has occurred (third case) (step 208). Then, in step 208, the ECU 50 issues to the MG 16 a command to increase the electric assist torque to be used in the present and next ignition start. A method similar to that of step 204 can be used in this case for correcting the electric assist torque. Where the electric assist torque at the time of the next ignition start is corrected, the correction amount obtained by the processing of the present step 206 is added to the electric assist torque after the correction performed by the processing of step 104.

Meanwhile, where a negative determination is made in step 206, the ECU 50 calculates the estimation value ACC-est of the crank angle acceleration (step 210). As described hereinabove, the estimation value ACC-est is estimated on the basis of the combustion torque generated by combustion which is to be initially performed in the target cylinder, the electric assist torque to be used in the present ignition start, and the friction torque of the internal combustion engine 14. The ECU 50 stores the relationship between the combustion torque, electric assist torque, and friction torque with the estimation value ACC-est as a map. In the present step 210, the ECU 50 calculates the estimation value ACC-est with reference to the map, such that a larger value is obtained as the combustion torque is higher, the electric assist torque is higher, and the friction torque is lower. The cylinder pressure maximum value Pmax acquired in step 108 can be used for the combustion torque. A value after the correction performed by the processing of step 104 can be used for the electric assist torque. A value calculated by the processing of step 102 can be used for the friction torque.

Then, the ECU 50 determines whether or not the crank angle acceleration ACC acquired in step 108 is less than the estimation value ACC-est (normal lower limit value), that is, whether or not the crank angle acceleration ACC has deviated from the normal range in a situation where the cylinder pressure maximum value Pmax is within the normal range (step 212). As described hereinabove, when the determination of the present step 212 is positive, it can be said that the present ignition start corresponds to the second case or the clutch abnormality case. Accordingly, in this case, the ECU 50 initially advances to step 214 and issues to the MG 16 a command to increase immediately the electric assist torque which is to be used in the next ignition start. The electric assist torque in this case may be increased by a predetermined amount with respect to the present value, or for example, the electric assist torque may be larger as the difference between the estimation value ACC-est and the crank angle acceleration ACC is larger.

Then, the ECU 50 determines whether the crank angle acceleration ACC does not increase (step 216). More specifically, it is determined whether or not the increase amount of the crank angle acceleration ACC that increases following the increase in the electric assist torque is equal to or less than a predetermined value despite the increase in the electric assist torque which is to be used in the present ignition start, this increase being caused by the processing of step 212. The predetermined value is set in advance as a value by which it is possible to determine whether or not the crank angle acceleration ACC increases significantly.

Where the determination of step 216 is negative, that is, when the increase of the crank angle acceleration ACC caused by the increase of the electric assist torque is confirmed, it can be determined that no failure has occurred in power transmission itself in the clutch 24. Accordingly, in this case, the ECU 50 determines that the engagement timing of the clutch 24 is delayed with respect to the combustion initiation timing (second case) (step 218). Furthermore, in step 218, the ECU 50 delays the initiation timings of sparking and fuel injection which are to be initially performed in the target cylinder at the time of the next ignition start. More specifically, the initiation timings may be delayed by a predetermined value with respect to the present values, or for example, the initiation timings may be further delayed with respect to the present values as the difference between the estimation value ACC-est and the crank angle acceleration ACC is larger (that is, as the decrease amount of the crank angle acceleration ACC with respect to the value at the time of normal operation is larger).

Meanwhile, where a positive determination is made in step 216, that is, when the increase in the crank angle acceleration ACC which accompanies the increase in the electric assist torque is not confirmed, the ECU 50 determines that a failure has occurred in power transmission in the clutch 24 (step 220). Further, in step 220, the ECU 50 executes backup control to ensure a reliable start of the internal combustion engine 14 in a situation where an abnormality has occurred in the clutch 24. More specifically, for example, a start using a starter motor (not depicted in the figure) provided in the internal combustion engine 14 is performed. Further, the ECU 50 restricts the use of the ignition start with the electric assist for the next and subsequent intermittent start operations. Instead, the ECU 50 may prohibit the use of the ignition start or prohibit the intermittent start itself.

Further, where the determination of step 212 is negative, that is, where the cylinder pressure maximum value Pmax is equal to or greater than the estimation value Pmax-est and the crank angle acceleration ACC is equal to or less than the estimation value ACC-est, the ECU 50 determines that the present ignition start with the electric assist is normal (step 222). The case in which the determinations of steps 202 and 206 are both negative includes not only the case in which the cylinder pressure maximum value Pmax is equal to or greater than the estimation value Pmax-est and the ignition delay time T is equal to or greater than the estimation value T-est, but also the case in which the cylinder pressure maximum value Pmax is equal to or greater than the estimation value Pmax-est, but the ignition delay time T is longer than the estimation value Test. However, the situation where the combustion torque has normally occurred, but the ignition delay is longer than the normal range is actually difficult to expect at the time of the ignition start. Therefore, the present routine is configured by excluding such a case from the expected cases.

With the cylinder pressure maximum value Pmax acquired on the basis of the detection value of the cylinder pressure sensor 56 and the ignition delay time T acquired by using this detection value, it is possible to acquire values corresponding to the actual measurement values of the ignition delay time and combustion torque in the initial explosion in the target cylinder at the time of the ignition start. Further, with the crank angle acceleration ACC acquired on the basis of the crank angle sensor 54, it is possible to acquire a value corresponding to the actual measurement value of the crank angle acceleration when the crankshaft 14a started to move at the time of the ignition start. In this case, where the value of the cylinder pressure is simply monitored, the synchronism of the engagement timing of the clutch 24 and the combustion initiation timing cannot be determined. Further, where the behavior of the engine revolution speed is simply monitored, it is difficult to discriminate the engagement states of the clutch 24. Therefore, it is difficult to determine whether the behavior of the engine revolution speed is affected by the combustion torque value or by the shift in the engagement timing of the clutch 24. By contrast, with the above-described routine depicted in FIG. 5, a combination of the cylinder pressure maximum value Pmax and the ignition delay time T and a combination of the cylinder pressure maximum value Pmax and the crank angle acceleration ACC are used to determine whether those three parameters are normal. As a result, it is possible to discriminate whether the startability of the present ignition start is affected by a shift between the engagement timing of the clutch 24 and the combustion initiation timing or by a lack of combustion torque. The presence/absence of a failure in power transmission in the clutch 24 can be also determined.

According to the abovementioned routine, adequate measures can be taken correspondingly to the results obtained in discriminating the factors affecting the startability of the present ignition start. In addition, the abovementioned various variations, such as the operation variation of the clutch 24, can be learned to stabilize the start time of the ignition start. More specifically, in the first case in which the engagement timing of the clutch 24 is earlier than the combustion initiation timing, the electric assist torque which is to be used in the present ignition start is increased. As a result, a lack of combustion torque associated with the shift between the engagement timing of the clutch 24 and the combustion initiation timing can be compensated, and therefore the start time can be stabilized. In relation to the time of the next ignition start, the initiation timings of the sparking and fuel injection to be initially performed in the target cylinder are made earlier instead of increasing the electric assist torque. As a result, the abovementioned shift can be suppressed at the time of the next ignition start, and therefore the start time can be stabilized while reducing the electric assist torque to a necessary minimum limit. The maximum torque required for the MG 16 is a sum of the maximum torque necessary to drive the vehicle and a torque necessary to start the internal combustion engine 14 as the vehicle runs (that is, the electric assist torque). Therefore, since the reduction in the electric assist torque leads to the reduction in the maximum torque required for the MG 16, the MG 16 can be miniaturized, thereby reducing the cost.

Further, in the second case in which the engagement timing of the clutch 24 is delayed with respect to the combustion initiation timing, the electric assist torque to be used in the present ignition start is also increased. As a result, a lack of the drive torque of the crankshaft 14a, which is caused by the delay of the engagement timing of the clutch 24 with respect to the combustion initiation timing (that is, a lack of torque which is a sum total of the combustion torque and electric assist torque), can be compensated. Therefore, the start time can be stabilized. In relation to the time of the next ignition start, the initiation timings of sparking and fuel injection to be initially performed in the target cylinder are delayed, instead of increasing the electric assist torque. As a result, the abovementioned shift can be suppressed at the time of the next ignition start, and therefore the start time can be stabilized while reducing the electric assist torque to a necessary minimum limit.

Further, in the third case in which a combustion failure has occurred, the electric assist torque to be used in the present and next ignition start operations is increased. As a result, a lack of combustion torque which has occurred at the time of the present ignition start and a lack of combustion torque which can occur at the time of the next ignition start can be compensated, and therefore the start time can be stabilized.

In the above-described Embodiment 1, the MG 16 is an example of the "motor" of the invention. Further, the "torque indication value acquisition unit" and "ignition delay time acquisition unit" of the invention are realized by the ECU 50 executing the processing of steps 108 and 200. The "crank angle acceleration acquisition unit" of the invention is realized by the ECU 50 executing the processing of steps 108 and 210. The "first correction unit" of the invention is realized by the ECU 50 executing the processing of steps 202 to 208. The "second correction unit" of the invention is realized by the ECU 50 executing the processing of steps 212 to 218. The "first clutch abnormality determination unit" of the invention is realized by the ECU 50 executing the processing of steps 216 and 220. The "second clutch abnormality determination unit" of the invention can be realized by the ECU 50 executing a series of processing described hereinbelow and depicted in FIG. 7. The "third clutch abnormality determination unit" can be realized by the ECU 50 executing the processing according to another method for determining a clutch abnormality case which is based on the description hereinbelow.

In the above-described Embodiment 1, the cylinder pressure maximum value Pmax is used as a torque indication value which indicates the value of the combustion torque generated by combustion which is to be initially performed in the target cylinder at the time of the ignition start. However, the torque indication value in the invention may be not only the cylinder pressure maximum value Pmax, but also, for example, a calorific value Q or an indicated torque calculated on the basis of the detection value of the cylinder pressure sensor 56.

Further, in Embodiment 1, the estimation value Pmax-est and estimation value T-est are each calculated on the basis of the atmospheric pressure. However, the first and second parameters which are used for acquiring those estimation values, those parameters relating to the torque indication value and ignition delay time, respectively, of the invention, may be used instead of the atmospheric pressure or together therewith. The parameters may be at least one of the engine cooling water temperature, engine lubricating oil temperature, and combustion property (for example, alcohol concentration when an alcohol fuel mixture is used). The degree of degradation of the fuel injection valve may be also used. For example, where the engine cooling water temperature or engine lubricating oil temperature is used, it is preferred that the estimation value Pmax-est be calculated such as to assume a larger value at a lower engine cooling water temperature or engine lubricating oil temperature and the estimation value Test be calculated such as to assume a smaller value at a lower engine cooling water temperature or engine lubricating oil temperature. Where the estimation value of the torque indication value is used as the first and second parameters, a parameter related to the cylinder pressure maximum value Pmax, which is an example of the torque indication value can be also used (for example, it can be a value obtained by determining experimentally in advance the value of the cylinder pressure maximum value Pmax within a range that can be taken when the ignition start has been operated normally, or the history of the cylinder pressure maximum values Pmax obtained when the ignition start has been operated normally in the past).

Further, in Embodiment 1, the initiation timing of sparking, and the like, and the electric assist torque are corrected on the basis of comparison results of the cylinder pressure maximum value Pmax, ignition delay time T, and crank angle acceleration ACC with the estimation values Pmax-est, Test, and ACC-est thereof. However, a method for correcting the initiation timing of sparking, and the like, and the electric assist torque of the invention is not limited to the abovementioned method. Thus, for example, the following map may be used. More specifically, a first map is provided that uses the acquisition value (for example, the cylinder pressure maximum value Pmax) and the estimation value (for example, Pmax-est) of the torque indication value and the ignition delay time T and the estimation value (for example, Test) as the input axes and stores, as a map value, at least one of at least a correction amount of the initiation timing of sparking, from among the initiation timings of sparking and fuel injection which are to be initially performed in the target cylinder at the time of the ignition start, and a correction amount of the electric assist torque which is to be used for the ignition start. The first map is provided for each first parameter and for each second parameter. Further, at least one of correction of at least the initiation timing of sparking, from among the initiation timings of sparking and fuel injection which are to be initially performed in the target cylinder at the time of the ignition start, and correction of the electric assist torque which is to be used for the ignition start is performed by referring to the first map. Likewise, with respect to a combination of the torque indication value and crank angle acceleration, a second map is provided that uses the acquisition value (for example, the cylinder pressure maximum value Pmax) and the estimation value (for example, Pmax-est) of the torque indication value and the crank angle acceleration ACC and the estimation value (for example, ACC-est) as the input axes and stores, as a map value, at least one of at least a correction amount of the initiation timing of sparking, from among the initiation timings of sparking and fuel injection which are to be initially performed in the target cylinder at the time of the ignition start, and a correction amount of the electric assist torque which is to be used for the ignition start. The second map is provided for each first parameter and for each third parameter. Further, at least one of correction of at least the initiation timing of sparking, from among the initiation timings of sparking and fuel injection which are to be initially performed in the target cylinder at the time of the ignition start, and correction of the electric assist torque which is to be used for the ignition start is performed by referring to the second map.

Further, in Embodiment 1, an example is explained in which the correction amount of the electric assist torque is changed according to a difference between the estimation value Pmax-est and the cylinder pressure maximum value Pmax (that is, according to the decrease amount in the cylinder pressure maximum value Pmax with respect to the value during normal operation). However, the correction amount of the electric assist torque in the invention may be also changed according to the cylinder pressure maximum value Pmax itself.

Further, the following method may be used for determining the crank abnormality case instead of, or together with, the method for determining the clutch abnormality case (steps 216 and 220) explained in Embodiment 1. Thus, when the cylinder pressure maximum value Pmax is equal to or greater than the estimation value Pmax-est and the crank angle acceleration ACC is less than the estimation value ACC-est, the cylinder pressure maximum value Pmax (that is, the combustion torque) is normal, but the rise of rotation of the crankshaft 14a is not good. Therefore, when the situation is not improved despite the delay of the initiation timing of sparking, or the like, at the time of the next ignition start, it can be determined that no shift has occurred between the engagement timing of the clutch 24 and the combustion initiation timing, but an abnormality has occurred in power transmission in the clutch 24. Accordingly, where the number of times the initiation timing of sparking, or the like, at the time of the next ignition start is delayed is equal to or greater than a predetermined number of times when the cylinder pressure maximum value Pmax is equal to or greater than the estimation value Pmax-est and the crank angle acceleration ACC is less than the estimation value ACC-est, it may be determined that an abnormality has occurred in power transmission in the clutch 24. Further, where the initiation timing of sparking, or the like, at the time of the next ignition start is delayed by a larger retardation correction amount as the difference between the estimation value ACC-est and the crank angle acceleration ACC is larger, as described in Embodiment 1, the following determination method may be used. Thus, when the retardation correction amount is equal to or greater than a predetermined value, it may be determined that an abnormality has occurred in power transmission in the clutch 24.

Figure 6B:
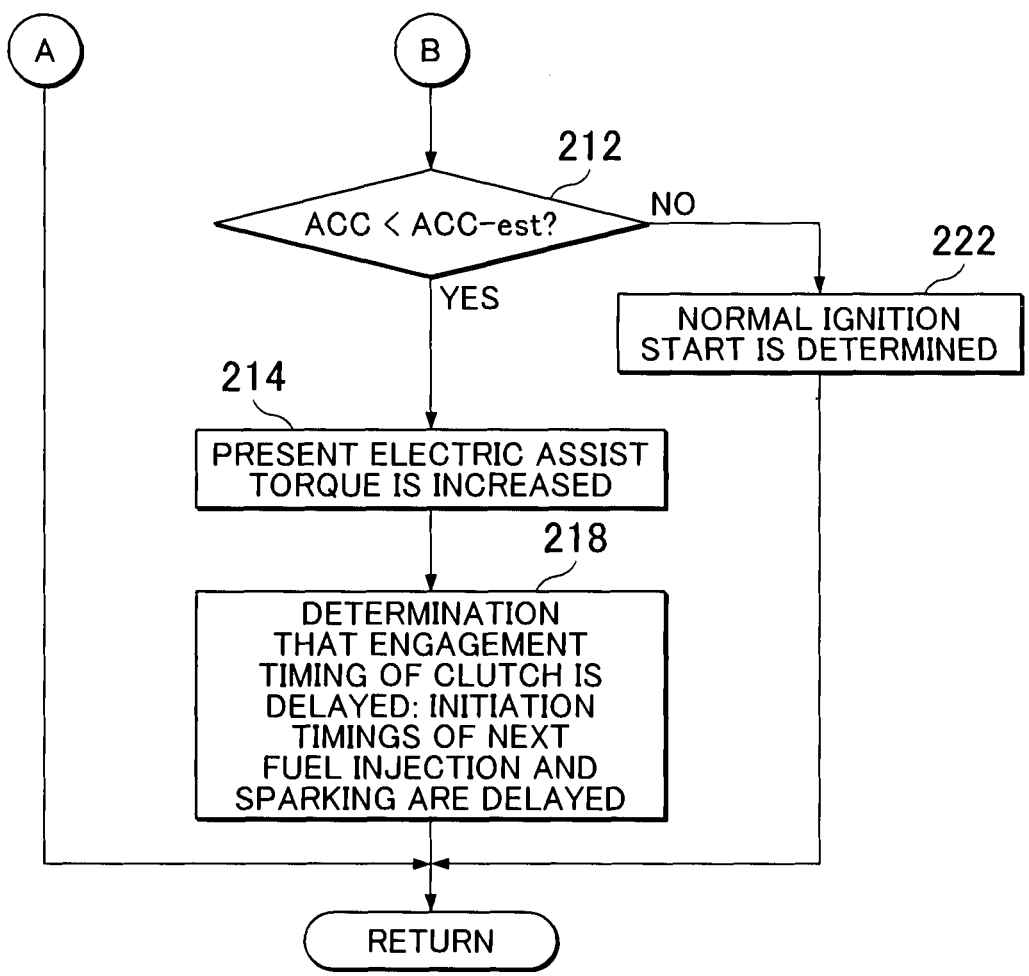
FIG. 6B is a flowchart of the subroutine obtained by changing part of the subroutine depicted in FIG. 5, such that the subroutine is suitable when a method for determining a clutch abnormality case depicted in FIG. 7 is used.
Figure 7:
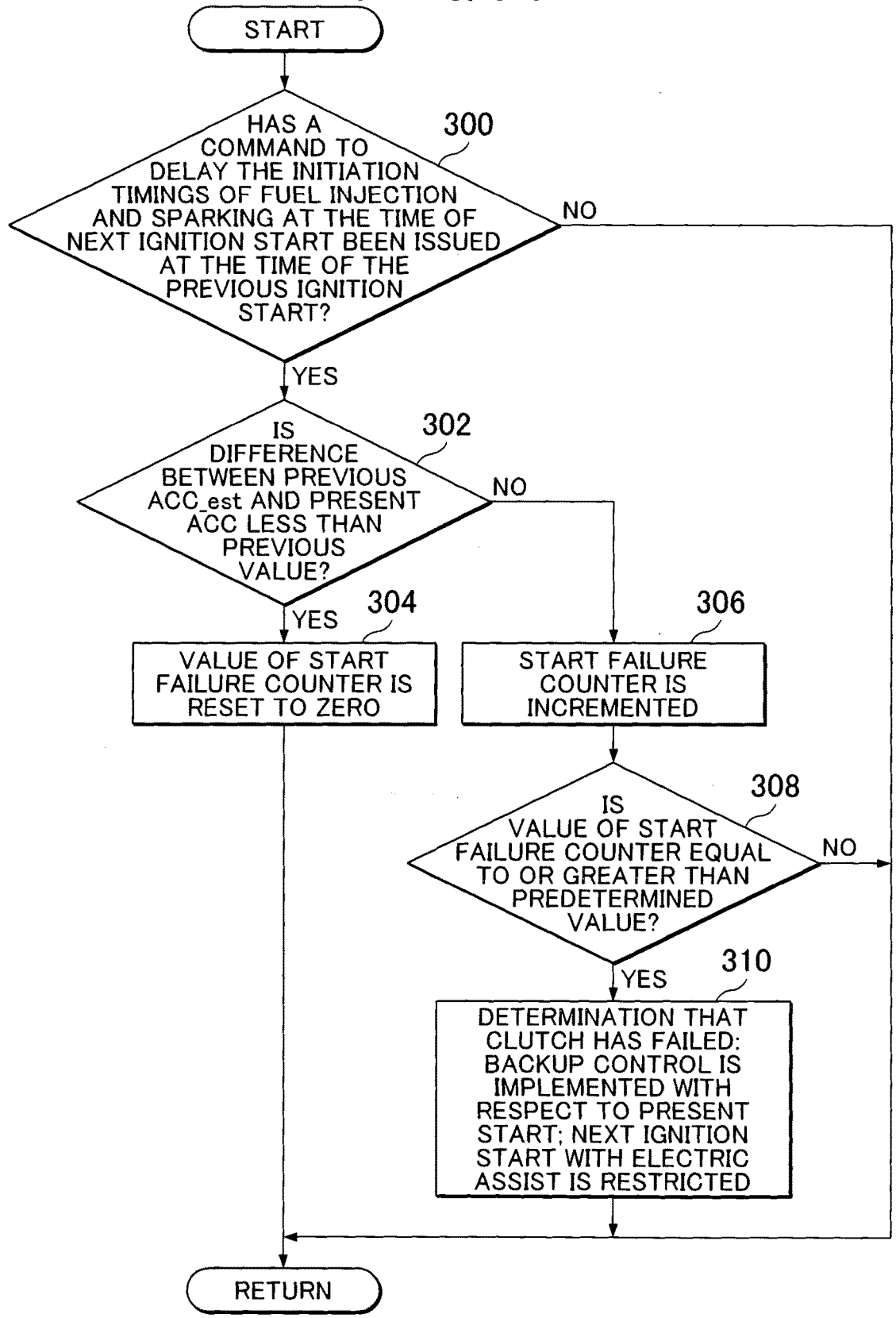
FIG. 7 is a flowchart of the routine for determining a clutch abnormality by another method.

An example of the method for determining a crank abnormality on the basis of whether or not the number of times the initiation timings of sparking and fuel injection at the time of the next ignition start are delayed is equal to or greater than a predetermined number of times will be explained hereinbelow with reference to FIGS. 6 and 7. FIG. 6 is a flowchart of the subroutine obtained by changing part of the subroutine depicted in FIG. 5, such that the subroutine be suitable when a method for determining a clutch abnormality depicted in FIG. 7 is used. FIG. 7 is a flowchart of the routine for determining a clutch abnormality by the method explained herein. The processing of the routine depicted in FIG. 7 is assumed to be executed in parallel with the processing of the subroutine depicted in FIG. 6 each time the ignition start with the electric assist is performed.

In the subroutine depicted in FIG. 6, where a positive determination is made in step 212 (that is, when the cylinder pressure maximum value Pmax is equal to or greater than the estimation value Pmax-est, and the crank angle acceleration ACC is less than the estimation value ACC-est), the ECU 50 executes the processing of step 214 and step 218. In this case, the lag (in other words, the correction) of the initiation timings of fuel injection and sparking at the time of the next ignition start which is caused by the processing of step 218 is assumed to be implemented by using the lag time calculated in the following manner. Thus, the lag time (in other words, the amount of retardation correction of the initiation timings of fuel injection and sparking at the time of the next ignition start) is calculated on the basis of a difference between the estimation value ACC-est of the crank angle acceleration at the time of the present ignition start and the crank angle acceleration ACC (actual measurement value) at the time of the present ignition start. More specifically, the lag time is calculated to be longer at a larger difference.

In the routine depicted in FIG. 7, the ECU 50 initially determines whether or not a command to delay the initiation timings of fuel injection and sparking at the time of the next ignition start has been issued by the processing of step 218 at the time of the previous ignition start (step 300). Where the present determination is negative, the present clutch abnormality determination is rapidly ended.

Meanwhile, where the determination of step 300 is positive, the ECU 50 determines whether or not the difference between the estimation value ACC-est used at the time of the previous ignition start and the crank angle acceleration ACC (actual measurement value) is less than the previous value (step 302). The crank angle acceleration ACC (actual measurement value) is a value acquired in the above-described step 108. The previous value, as referred to herein, is the difference serving as a basis for calculating the lag time for the present ignition start, that is, the difference between the estimation value ACC-est used at the time of the previous ignition start and the crank angle acceleration ACC (actual measurement value) at the time of the previous ignition start.

Where the determination of the present step 302 is positive, that is, where the abovementioned difference has become less than the previous value because of the lag of the initiation timings of fuel injection and sparking at the time of the present ignition start, it can be determined that the shift between the engagement timing of the clutch 24 and the combustion initiation timing has been reduced by the lag of the initiation timings induced at the time of the present ignition start. In this case, the ECU 50 resets the value of the start failure counter to zero (step 304).

Meanwhile, when the determination of step 302 is negative, that is, when the shift between the engagement timing of the clutch 24 and the combustion initiation timing has not been reduced by the lag of the initiation timings induced at the time of the present ignition start, the ECU 50 executes increment processing for incrementing the value of the start failure counter by 1 (step 306). Then, the ECU 50 determines whether or not the value of the start failure counter is equal to or greater than a predetermined value (step 308). Where the resultant determination of step 308 is positive, that is, when the shift between the engagement timing of the clutch 24 and the combustion initiation timing has not been reduced despite the fact that the initiation timings of fuel injection and sparking have been delayed the predetermined number of times, the ECU 50 advances to step 310. The contents of the processing of step 310 is the same as that of the processing of step 220 described hereinabove. Thus, it is determined that a failure has occurred in the clutch 24, and measures against the clutch failure are taken.

Further, in the above-described Embodiment 1, the combustion torque generated by combustion which is to be initially performed in the target cylinder, the electric assist torque which is to be used in the present ignition start, and the friction torque of the internal combustion engine 14 are taken as the third parameter related to the crank angle acceleration ACC in order to calculate the estimation value ACC-est. However, the calculation of the estimation value ACC-est, which is the normal lower limit value of the crank angle acceleration ACC, may be also performed on the basis of any one or two of those combustion torque, electric assist torque, and friction torque. Further, the third parameter which is used for calculating the estimation value ACC-est may be also the atmospheric pressure detected by the atmospheric pressure sensor 64 and the friction torque of the internal combustion engine 14.

Further, in Embodiment 1, the estimation value Pmax-est corresponding to the normal lower limit value, which is the lower limit value of the range of the cylinder pressure maximum value Pmax that can be taken when the ignition start is performed normally, is used as the "estimation value" based on the first parameter related to the cylinder pressure maximum value Pmax which is an example of the "torque indication value" in the invention. However, the "estimation value" in the invention may be a random value selected from the "torque indication values" that can be taken when the ignition start is performed normally, instead of the normal lower limit value. The same is true with respect to the "estimation value" of the "ignition delay time", and a random value selected from the "ignition delay time" that can be taken when the ignition start is performed normally may be used instead of the estimation value T-est corresponding to the normal upper limit value. The same is also true with respect to the "estimation value" of the "crank angle acceleration", and a random value selected from the "crank angle accelerations" that can be taken when the ignition start is performed normally may be used instead of the estimation value ACC-est corresponding to the normal lower limit value.

Further, in Embodiment 1, the correction of both the initiation timing of sparking or the like and the electric assist torque is performed when the present ignition start corresponds to the first case or second case. However, in such a case, only either one of the corrections may be performed.

Further, in the above-described Embodiment 1, an example is explained in which the ignition start is used when the internal combustion engine 14 is restarted from an intermittent stop (automatic stop). However, the ignition start, which is the object of the invention, is not limited to the time of restart from the intermittent stop. For example, included also is a mode in which the ignition start is performed when an ignition switch is switched OFF immediately after a high-load operation of the internal combustion engine 14 has been executed, and the restart is performed immediately thereafter.

Further, in Embodiment 1, an example is explained in which the electric assist is performed by causing the MG 16 to function as a motor. However, the motor used for performing the electric assist in the invention may be a "simple" motor which is configured not to have a generator function.

Further, in Embodiment 1, the explanation relates to the hybrid vehicle 10 provided with the internal combustion engine 14 and the MG 16 as power sources. The invention can be advantageously used with a configuration which is provided with a motor such as the MG 16 as a power source and in which a clutch is interposed between the motor and the internal combustion engine, but the vehicle which is the object of the invention is not necessarily limited to the hybrid vehicle 10. Thus, the "motor configured to be capable of rotationally driving a crankshaft" in the invention may be a motor which is not used as the power source for the vehicle, by contrast with the MG 16.

Further, in Embodiment 1, it is distinguished whether a shift between the engagement timing of the clutch 24 and the combustion initiation timing or a lack of combustion torque is a factor affecting the startability of the present ignition start by using both the combination of the cylinder pressure maximum value Pmax and the ignition delay time T and the combination of the cylinder pressure maximum value Pmax and the crank angle acceleration ACC, and it is also distinguished whether an abnormality of power transmission in the clutch 24 is present or absent. An adequate measure corresponding to the results of discriminating the factors affecting the startability of the present ignition start is then taken. However, the invention is not limited to the feature of using both of the above-described combinations and, as explained hereinbelow with reference to the flowchart depicted in FIG. 8, only the combination of the cylinder pressure maximum value Pmax and the ignition delay time T may be used.

Figure 8:
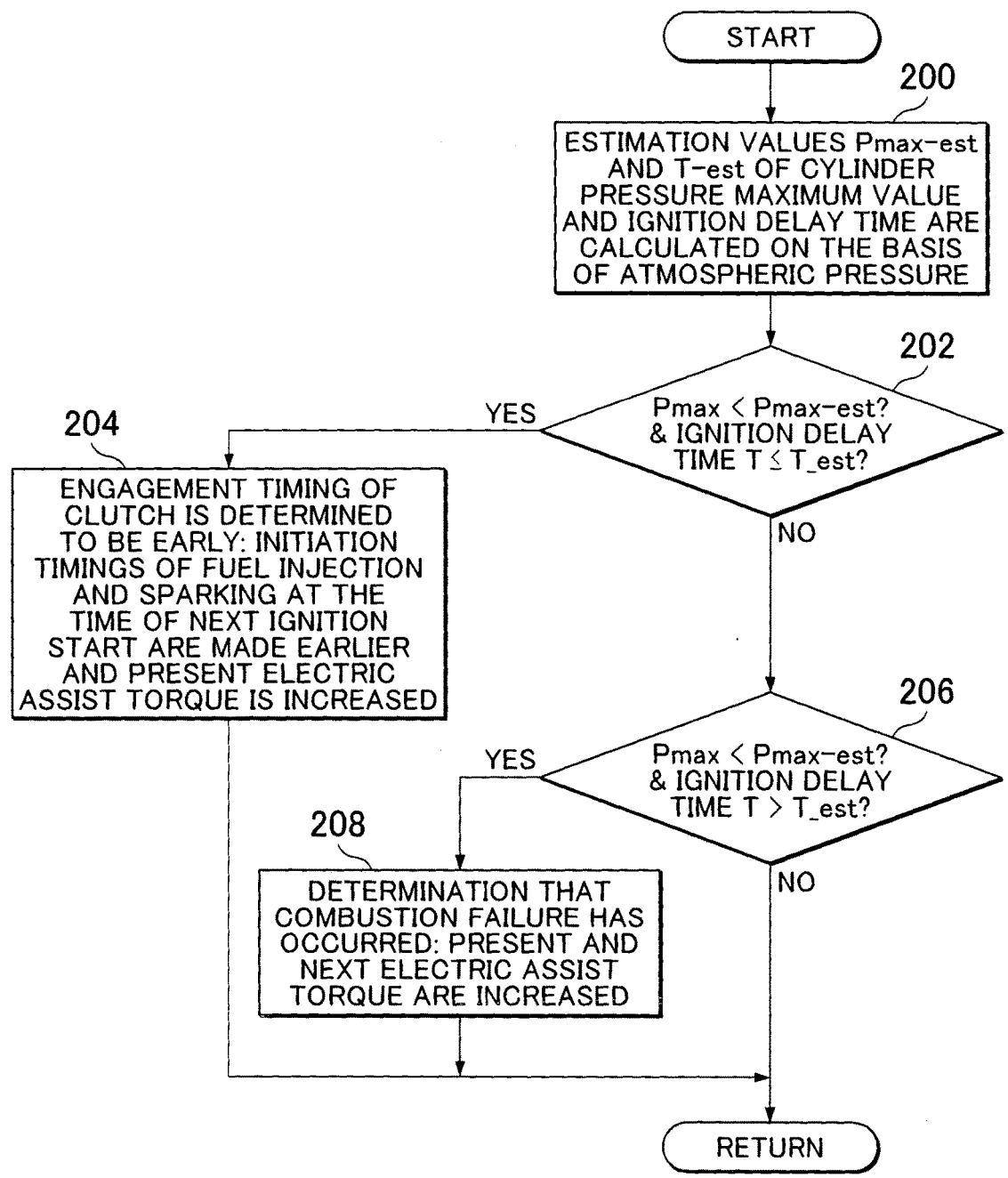
FIG. 8 is a flowchart of another subroutine that defines the determination processing relating to the startability of the present ignition start and the correction processing relating to the ignition start based on the results of the determination.

FIG. 8 is a flowchart of another subroutine that defines the determination processing relating to the startability of the present ignition start and the correction processing relating to the ignition start based on the results of the determination. The processing of the subroutine depicted in FIG. 8 is assumed to be executed instead of the processing of the subroutine depicted in FIG. 5.

The processing of the subroutine depicted in FIG. 8 is the same as the processing of the subroutine depicted in FIG. 5, except that the processing of steps 210 to 222 corresponding to the processing relating to the crank angle acceleration ACC (that is, the processing using the combination of the cylinder pressure maximum value Pmax and the crank angle acceleration ACC) is omitted.

In the embodiment of the invention, it is possible to detect the case in which the engagement timing of the clutch 24 is earlier than the combustion initiation timing (the first case) or the case in which a combustion failure has occurred (the third case) by using only the combination of the cylinder pressure maximum value Pmax and the ignition delay time T, as in the processing of the subroutine depicted in FIG. 8, and to take the above-described measures corresponding to the detection result.

The invention claimed is:

1. A control device for a vehicle including:
an internal combustion engine including: a fuel injection valve configured to inject fuel directly into a cylinder; a sparkplug configured to spark to ignite a gas mixture; a cylinder pressure sensor configured to detect a cylinder pressure; and a crank angle sensor configured to detect a crank angle;
a motor configured to be capable of rotationally driving a crankshaft of the internal combustion engine; and
a clutch configured to connect or cut off a power transmission path between the internal combustion engine and the motor, wherein
at the time of ignition start, in which the internal combustion engine is started by executing fuel injection and ignition for a target cylinder, which has been stopped in an expansion stroke, rotation of the crankshaft by the motor is electrically assisted during engagement with the clutch, the control device comprising:
an electronic control unit comprising a central processing unit (CPU) for executing programs stored on a storage circuit including memory and an input/output port, wherein
the electronic control unit is configured to acquire, with respect to a torque indication value indicating an amount of a combustion torque generated by combustion to be initially performed in the target cylinder at the time of the ignition start, a first estimation value based on an acquisition value which is based on a detection value of the cylinder pressure sensor and a first parameter related to the torque indication value,
the electronic control unit is configured to acquire, with respect to an ignition delay time which is a time from an initiation timing of sparking relating to combustion which is to be initially performed in the target cylinder at the time of the ignition start to a beginning timing of ignition, a second estimation value based on the acquisition value which is based on the detection value of the cylinder pressure sensor and a second parameter related to the ignition delay time, and
the electronic control unit is configured to correct at least one of the initiation timing of sparking which is to be initially performed in the target cylinder at the time of the ignition start and an electric assist torque which is to be used for the ignition start, on the basis of a combination of a relationship between the acquisition value of the torque indication value and the first estimation value of the torque indication value and a relationship between the acquisition value of the ignition delay time and the second estimation value of the ignition delay time.

2. The control device according to claim 1, wherein
the electronic control unit is further configured to acquires, with respect to a crank angle acceleration when the crankshaft starts to rotate at the time of the ignition start, a third estimation value based on another acquisition value based on a detection value of the crank angle sensor and a third parameter related to the crank angle acceleration; and
the electronic control unit is further configured to correct the at least one of the initiation timing of sparking which is to be initially performed in the target cylinder at the time of the ignition start and the electric assist torque which is to be used for the ignition start, on the basis of a combination of a relationship between the acquisition value of the torque indication value and the first estimation value of the torque indication value and a relationship between the acquisition value of the crank angle acceleration and the third estimation value of the crank angle acceleration.

3. The control device according to claim 2, wherein the electronic control unit is further configured to executes at least one of a retardation of the initiation timing of sparking which is to be initially performed in the target cylinder at the time of the next ignition start and an increase in the electric assist torque which is to be used in the present or next ignition start, in the case in which the acquisition value of the torque indication value is equal to or greater than the first estimation value of the torque indication value and the acquisition value of the crank angle acceleration is less than the third estimation value of the crank angle acceleration.

4. The control device according to claim 3, wherein the electronic control unit is further configured to determine if an abnormality has occurred in the clutch, when an increase amount of the crank angle acceleration, that accompanies the increase in the electric assist torque, is equal to or less than a predetermined value despite the increase in the electric assist torque that is to be used for the ignition start, in the case in which the acquisition value of the torque indication value is equal to or greater than the first estimation value of the torque indication value and the acquisition value of the crank angle acceleration is less than the third estimation value of the crank angle acceleration.

5. The control device according to claim 3, wherein the electronic control unit is further configured to determine if an abnormality has occurred in the clutch, when a number of times that the ignition start, in which the initiation timing of sparking has been delayed is equal to or greater than a predetermined number of times, in the case in which the acquisition value of the torque indication value is equal to or greater than the first estimation value of the torque indication value and the acquisition value of the crank angle acceleration is less than the third estimation value of the crank angle acceleration.

6. The control device according to claim 3, wherein
in the case in which the acquisition value of the torque indication value is equal to or greater than the first estimation value of the torque indication value and the acquisition value of the crank angle acceleration is less than the third estimation value of the crank angle acceleration, the initiation timing of sparking is delayed by a larger retardation correction amount as a difference between the third estimation value and the acquisition value of the crank angle acceleration is larger; and
the electronic control unit is further configured to determine that an abnormality has occurred in the clutch, when the retardation correction amount is equal to or greater than a predetermined value, in the case in which the acquisition value of the torque indication value is equal to or greater than the first estimation value of the torque indication value and the acquisition value of the crank angle acceleration is less than the third estimation value of the crank angle acceleration.

7. The control device according to claim 1, wherein
the electronic control unit is further configured to execute, by referring to a second map, at least one of correction of the initiation timing of sparking which is to be initially performed in the target cylinder at the time of the ignition start and correction of the electric assist torque which is to be used for the ignition start;

the second map stores, as a map value, at least one of a correction amount of the initiation timing of sparking which is to be initially performed in the target cylinder at the time of the ignition start and a correction amount of the electric assist torque which is to be used for the ignition start, stores the acquisition value of the torque indication value and the first estimation value of the torque indication value and the acquisition value of the crank angle acceleration and the third estimation value of the crank angle acceleration as input axes; and the second map is provided for each of the first parameter and for each of the third parameter.

8. The control device according to claim 1, wherein the electronic control unit is further configured to perform a correction on at least one of an advance angle of the initiation timing of sparking which is to be initially performed in the target cylinder at the time of the next ignition start and an increase in the electric assist torque which is to be used in the present or next ignition start, in the case in which the acquisition value of the torque indication value is less than the first estimation value of the torque indication value and the acquisition value of the ignition delay time is equal to or less than the second estimation value of the ignition delay time.

9. The control device according to claim 1, wherein the electronic control unit is further configured to increases the electric assist torque which is to be used in the present or next ignition start, in the case in which the acquisition value of the torque indication value is less than the first estimation value of the torque indication value and the acquisition value of the ignition delay time is greater than the second estimation value of the ignition delay time.

10. The control device according to claim 1, wherein
the electronic control unit is further configured to executes, by referring to a first map, at least one of correction of the initiation timing of sparking which is to be initially performed in the target cylinder at the time of the ignition start and correction of the electric assist torque which is to be used for the ignition start;

the first map stores, as a map value, at least one of a correction amount of the initiation timing of sparking which is to be initially performed in the target cylinder at the time of the ignition start and a correction amount of the electric assist torque which is to be used for the ignition start, stores the acquisition value of the torque indication value and the first estimation value of the torque indication value and the acquisition value of the ignition delay time and the second estimation value of the ignition delay time as input axes; and the first map is provided for each of the first parameter and for each of the second parameter.

11. A vehicle comprising:

an internal combustion engine including: a fuel injection valve configured to inject fuel directly into a cylinder; a sparkplug configured to spark to ignite a gas mixture; a cylinder pressure sensor configured to detect a cylinder pressure; and a crank angle sensor configured to detect a crank angle;

a motor configured to be capable of rotationally driving a crankshaft of the internal combustion engine;

a clutch configured to connect or cut off a power transmission path between the internal combustion engine and the motor; and an electronic control unit comprising a central processing unit (CPU) for executing programs stored on a storage circuit including memory and an input/output port, wherein at the time of ignition start, in which the internal combustion engine is started by executing fuel injection and ignition for a target cylinder, which has been stopped in an expansion stroke, rotation of the crankshaft by the motor is electrically assisted during engagement with the clutch, the control device comprising:

the electronic control unit is configured to acquire, with respect to a torque indication value indicating an amount of a combustion torque generated by combustion to be initially performed in a target cylinder at the time of the ignition start, a first estimation value based on an acquisition value which is based on a detection value of the cylinder pressure sensor and a first parameter related to the torque indication value, the electronic control unit is configured to acquires, with respect to an ignition delay time which is a time from an initiation timing of sparking relating to combustion which is to be initially performed in the target cylinder at the time of the ignition start to a beginning timing of ignition, a second estimation value based on the acquisition value which is based on the detection value of the cylinder pressure sensor and a second parameter related to the ignition delay time, and the electronic control unit is configured to correct at least one of the initiation timing of sparking which is to be initially performed in the target cylinder at the time of the ignition start and an electric assist torque which is to be used for the ignition start, on the basis of a combination of a relationship between the acquisition value of the torque indication value and the first estimation value of the torque indication value and a relationship between the acquisition value of the ignition delay time and the second estimation value of the ignition delay time.

* * * * *